US007356686B2

(12) United States Patent
Nakajima

(10) Patent No.: US 7,356,686 B2
(45) Date of Patent: Apr. 8, 2008

(54) INITIALIZATION OF RANGE REGISTERS WITHIN CHIPSETS ON SPARE PROCESSOR CELLS

(75) Inventor: Eiji Nakajima, Minato-ku (JP)

(73) Assignee: NEC Corporation, Tokyo (JP)

( * ) Notice: Subject to any disclaimer, the term of this patent is extended or adjusted under 35 U.S.C. 154(b) by 482 days.

(21) Appl. No.: 10/857,541

(22) Filed: Jun. 1, 2004

(65) Prior Publication Data

US 2004/0255109 A1 Dec. 16, 2004

(30) Foreign Application Priority Data

Jun. 2, 2003 (JP) .............................. 2003-156109

(51) Int. Cl.
G06F 9/00 (2006.01)
(52) U.S. Cl. .......................................... 713/100; 713/1
(58) Field of Classification Search .................... 713/1, 713/100
See application file for complete search history.

(56) References Cited

U.S. PATENT DOCUMENTS

| 6,904,139 B2* | 6/2005 | Brown et al. .......... 379/207.02 |
| 2004/0015943 A1* | 1/2004 | Chen .......................... 717/168 |
| 2004/0193706 A1* | 9/2004 | Willoughby et al. ........ 709/223 |

FOREIGN PATENT DOCUMENTS

| JP | 63-182768 | 7/1988 |
| JP | 8-147111 | 6/1996 |
| JP | 10-333890 | 12/1998 |
| JP | 2000-187533 A | 7/2000 |
| JP | 2000-311035 A | 11/2000 |
| JP | 2002-14939 A | 1/2002 |
| JP | 2002-132741 A | 5/2002 |
| JP | 2002-312297 | 10/2002 |
| JP | 2002-312297 A | 10/2002 |

OTHER PUBLICATIONS

Nakajima, Eiji, "Hardware Initialization System by Firmware", Apr. 7, 2000, Japanese Publication 2000-187533.*

* cited by examiner

Primary Examiner—A. Elamin
Assistant Examiner—Tse Chen
(74) Attorney, Agent, or Firm—Sughrue Mion, PLLC

(57) ABSTRACT

A distributed computer system is composed of a plurality of cells, a service processor, and first and second modules. Each of the cells includes a CPU, a memory, and range registers used for resource routing. At least one cell is used as a spare cell, and the remainder(s) of the cells is activated to provide an online system. The first module is programmed to provide a memory region of the online system with initial values to be set into the range registers of the spare cell in response to booting the online system. The service processor provides a copy of the initial values onto the memory of the spare cell in response to a request for activating the spare cell. The second module is programmed to put the initial values obtained from the copy into the range registers of the chipset on the spare cell.

16 Claims, 22 Drawing Sheets

Fig. 2

PCI MEMORY RANGE REGISTER 131 (231, 331)

|  | CELL C1 | CELL C2 | CELL C3 (VIRTUAL CELL) | ... | CELL CN |
|---|---|---|---|---|---|
| BOTTOM | X1 | X2 | X3 | | ... |
| TOP | X1+α1 | X2+α2 | X3+α3 | | ... |

PCI I/O RANGE REGISTER 132 (232, 332)

|  | CELL C1 | CELL C2 | CELL C3 (VIRTUAL CELL) | ... | CELL CN |
|---|---|---|---|---|---|
| BOTTOM | Y1 | Y2 | Y3 | | ... |
| TOP | Y1+β1 | Y2+β2 | Y3+β3 | | ... |

INTERRUPT RANGE REGISTER 133 (233, 333)

|  | CELL C1 | CELL C2 | CELL C3 (VIRTUAL CELL) | ... | CELL CN |
|---|---|---|---|---|---|
| BOTTOM | Z1 | Z2 | Z3 | | ... |
| TOP | Z1+η1 | Z2+η2 | Z3+η3 | | ... |

XXXXX RANGE REGISTER 13x (23x, 33x)

|  | CELL C1 | CELL C2 | CELL C3 (VIRTUAL CELL) | ... | CELL CN |
|---|---|---|---|---|---|
| BOTTOM | W1 | W2 | W3 | | ... |
| TOP | W1+θ1 | W2+θ2 | W3+θ3 | | ... |

Fig. 7

| 31 | 30 24 | 23 16 | 15 11 | 10 8 | 7 2 | 1 | 0 |
|---|---|---|---|---|---|---|---|
| 1 BIT | 7 BIT | 8 BIT | 5 BIT | 3 BIT | 6 BIT | 1 BIT | 1 BIT |
| ENABLE BIT | RESERVED | BUS NUMBER | DEVICE NUMBER | FUNCTION NUMBER | REGISTER NUMBER | 0 | 0 | pca

Fig. 8

| PHYSICAL CELL NUMBER | BUS NUMBER |
|---|---|
| 1 | BUSNO1 |
| 2 | BUSNO2 |
| 3 | BUSNOA |
| : | : |
| n | : | cbt

Fig. 9

| BUS NUMBER | DEVICE NUMBER | FUNCTION NUMBER | REGISTER NUMBER | CELL CONFIGURATION REGISTER SET |
|---|---|---|---|---|
| BUSNO1 | D1 | F1 | 0 | XX REGISTER |
| | | | R1 | PCI MEMORY REGISTER (131) |
| | | | 252 | XX REGISTER |
| | | | ⋮ | |
| | D2 | F2 | 0 | XX REGISTER |
| | | | R2 | PCI I/O RANGE REGISTER (132) |
| | | | 252 | XX REGISTER |
| | | | ⋮ | |
| | D3 | F3 | 0 | XX REGISTER |
| | | | R3 | INTERRUPT RANGE REGISTER (133) |
| | | | 252 | XX REGISTER |
| | | | ⋮ | |
| | Dx | Fx | 0 | XX REGISTER |
| | | | Rx | XX RANGE REGISTER |
| | | | 252 | XX REGISTER |
| BUSNO2 | D1 | F1 | 0 | XX REGISTER |
| | | | R1 | MEMORY RANGE REGISTER (231) |
| | | | 252 | XX REGISTER |
| | | | ⋮ | |
| | D2 | F2 | 0 | XX REGISTER |
| | | | R2 | PCI I/O RANGE REGISTER (232) |
| | | | 252 | XX REGISTER |
| | | | ⋮ | |
| | D3 | F3 | 0 | XX REGISTER |
| | | | R3 | INTERRUPT RANGE REGISTER (233) |
| | | | 252 | XX REGISTER |
| | | | ⋮ | |
| | Dx | Fx | 0 | XX REGISTER |
| | | | Rx | XX RANGE REGISTER |
| | | | 252 | XX REGISTER |

CCS

| PHYSICAL CELL NUMBER | VIRTUAL CELL FLAG | BUS NUMBER |
|---|---|---|
| 1 | 0:ONLINE | Don'tCare |
| 2 | 0:ONLINE | Don'tCare |
| 3 | 1:OFFLINE (VIRTUAL CELL) | BUSNOA |
| ⋮ | ⋮ | ⋮ |
| n | ⋮ | ⋮ |

Fig. 11

| 31 | 30   24 | 23   16 | 15   11 | 10   8 | 7   2 | 1 | 0 |
|---|---|---|---|---|---|---|---|
| 1 BIT | 7 BIT | 8 BIT | 5 BIT | 3 BIT | 6 BIT | 1 BIT | 1 BIT |
| ENABLE BIT | RESERVED | BUS NUMBER | DEVICE NUMBER | FUNCTION NUMBER | REGISTER NUMBER | 0 | 0 | vca

Fig. 12

VCCS

| BUS NUMBER | DEVICE NUMBER | FUNCTION NUMBER | REGISTER NUMBER | VIRTUAL CONFIGURATION REGISTER SET |
|---|---|---|---|---|
| BUSNOA (VIRTUAL CELL) | D1 | F1 | 0 | XX REGISTER |
| | | | : | : |
| | | | R1 | PCI MEMORY RANGE REGISTER (A31) |
| | | | : | : |
| | | | 252 | XX REGISTER |
| | : | | | |
| | D2 | F2 | 0 | XX REGISTER |
| | | | : | : |
| | | | R2 | PCI I/O RANGE REGISTER (A32) |
| | | | : | : |
| | | | 252 | XX REGISTER |
| | : | | | |
| | D3 | F3 | 0 | XX REGISTER |
| | | | : | : |
| | | | R3 | INTERRUPT RANGE REGISTER (A33) |
| | | | : | : |
| | | | 252 | XX REGISTER |
| | : | | | |
| | Dx | Fx | 0 | XX REGISTER |
| | | | : | : |
| | | | Rx | XX RANGE REGISTER |
| | | | : | : |
| | | | 252 | XX REGISTER |

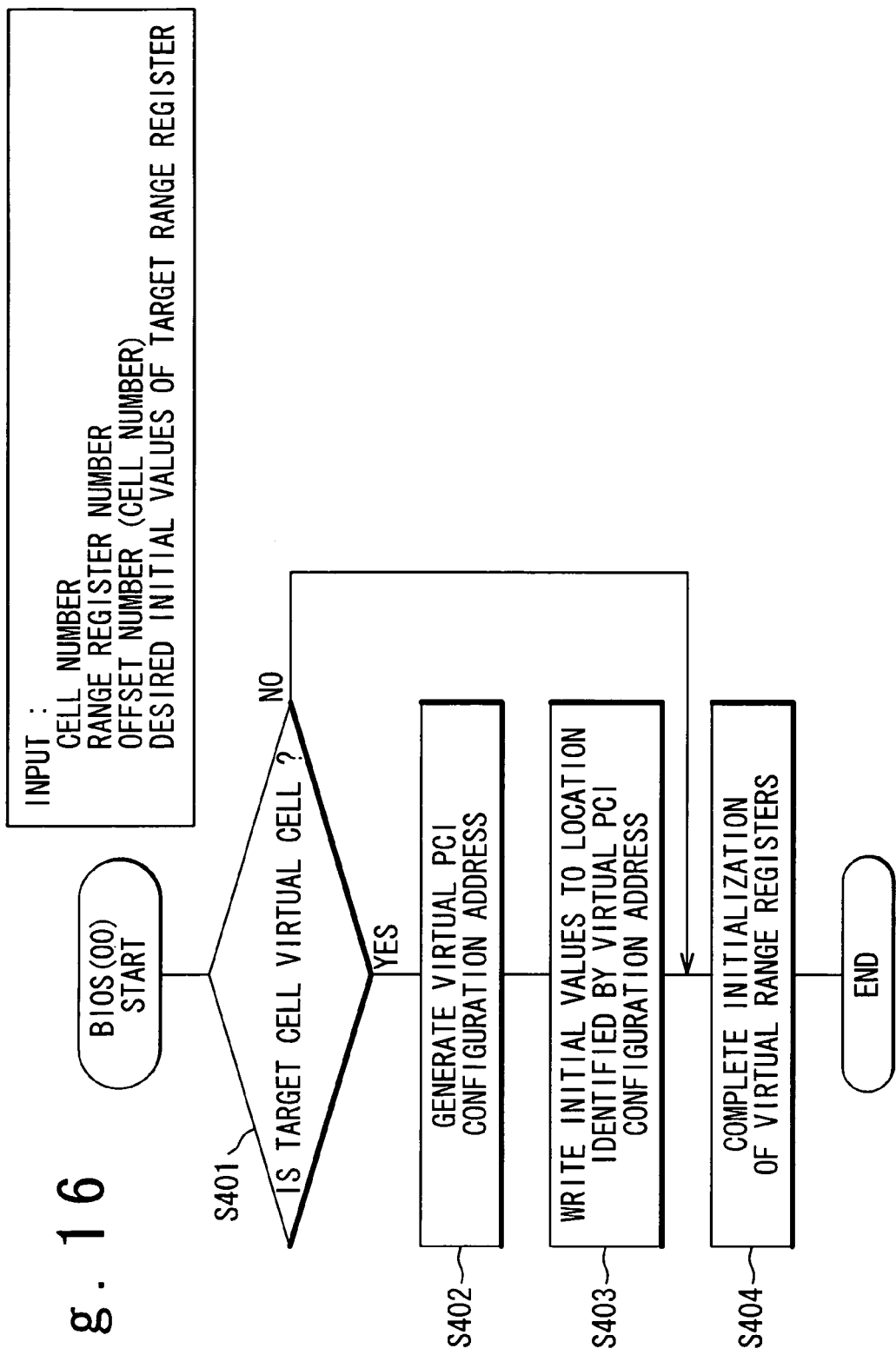

Fig. 17

| CELL NUMBER (OFFSET) | DEVICE NUMBER | FUNCTION NUMBER | REGISTER NUMBER | VIRTUAL CONFIGURATION REGISTER SET |
|---|---|---|---|---|
| 1 | D1 | F1 | 0 | XX REGISTER |
|  |  |  | R1 | PCI MEMORX RANGE REGISTER (131) |
|  |  |  | 252 | XX REGISTER |
|  |  |  | ⋮ |  |
|  | D2 | F2 | 0 | XX REGISTER |
|  |  |  | R2 | PCI I/O RANGE REGISTER (132) |
|  |  |  | 252 | XX REGISTER |
|  |  |  | ⋮ |  |
|  | D3 | F3 | 0 | XX REGISTER |
|  |  |  | R3 | INTERRUPT RANGE REGISTER (133) |
|  |  |  | 252 | XX REGISTER |
|  |  |  | ⋮ |  |
|  | Dx | Fx | 0 | XX REGISTER |
|  |  |  | Rx | XX RANGE REGISTER |
|  |  |  | 252 | XX REGISTER |
|  |  |  | ⋮ |  |
| 3 | D1 | F1 | 0 | XX REGISTER |
|  |  |  | R1 | PCI MEMORY RANGE REGISTER(=A31) |
|  |  |  | 252 | XX REGISTER |
|  |  |  | ⋮ |  |
|  | D2 | F2 | 0 | XX REGISTER |
|  |  |  | R2 | PCI I/O RANGE REGISTER (=A32) |
|  |  |  | 252 | XX REGISTER |
|  |  |  | ⋮ |  |
|  | D3 | F3 | 0 | XX REGISTER |
|  |  |  | R3 | INTERRUPT RANGE REGISTER (=A33) |
|  |  |  | 252 | XX REGISTER |
|  |  |  | ⋮ |  |
|  | Dx | Fx | 0 | XX REGISTER |
|  |  |  | Rx | XX RANGE REGISTER |
|  |  |  | 252 | XX REGISTER |

INITIAL ADDRESS "X" WITHIN MEMORY mvccs

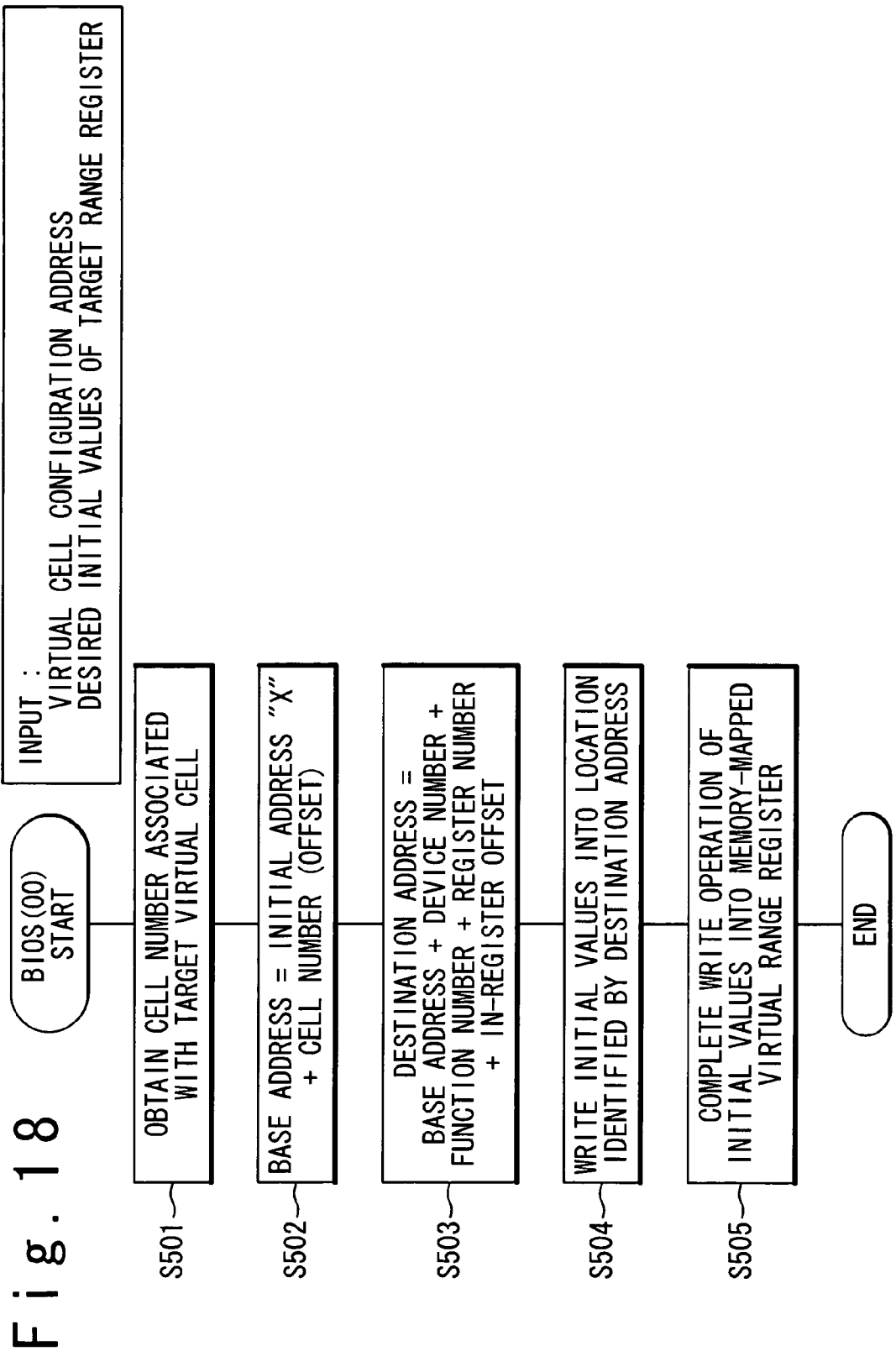

INITIALIZATION OF RANGE REGISTERS WITHIN CHIPSETS ON SPARE PROCESSOR CELLS

BACKGROUND OF THE INVENTION

1. Field of the Invention

The present invention is generally related to distributed computer systems (or multiprocessor computer systems), more particularly, to initialization of range registers used for resource routing within distributed computer systems.

2. Description of the Related Art

Recent computer systems, such as blade server systems, often adopt distributed processor architecture. Such computer systems are typically composed of a plurality of motherboards, referred to as cells, each including a processor, a memory and a controller chipset. The cells are connected over system buses to achieve scale-out computing. The distributed processor architecture has an advantage of improved performance and flexibility, and this promotes the use of distributed processor architecture.

Computer systems adopting distributed processor architecture often include one or more spare cells. In such a distributed computer systems, some cells are activated to function as an "online" system, and the remainders are deactivated as spare cells. When requested, one or more spare cells are brought online and incorporated into the online system to increase the performance of the system.

Multicell-based computer systems often achieve resource routing for PCI (Peripheral Component Interconnection) resources on the basis of range registers within controller chipsets. Range registers are used for storing information on assignment of resource ranges to the respective cells; range registers contains locations of resource ranges allocated to the respective cells within the resource space. For example, PCI memory range registers are used for storing locations of PCI memory ranges allocated to the respective cells within the PCI memory space. Correspondingly, PCI I/O range registers are used for storing locations of PCI I/O ranges allocated to the respective cells within the PCI I/O space.

The resource routing is typically achieved as follows. When a CPU issues an access request for a specific resource range, the chipset associated with the requesting CPU determines the owner of the specific resource range (that is, the cell to which the destined resource range is allocated), on the basis of the locations stored in the range registers, and forwards the access request to the owner cell. Forwarding the access request is achieved through broadcasting the access request on the system bus. Each cell receives the access request and determines whether the each cell is the owner of the resource range for which the access request is destined. The owner cell then routes the access request to the I/O controller associated therewith to achieve the access to the destined resource range.

Range registers are needed to be initialized when the computer system is booted. Initialization of the range registers is performed by a BIOS (basic input output system) within the online system. The BIOS sets initial values indicative of locations of PCI resource ranges into the respective range registers to thereby initialize the range registers. In order to simplify the initialization procedure of the range registers, the cells are often configured with the same initial values within the range registers.

For a computer system including a spare cell, initialization of range registers may be achieved through any of the following two methods.

The first initialization method involves determining cell configuration of the online system, and initializing range registers only within the online cells; the BIOS within the online system does not initialize range registers within offline cells. This initialization method experiences a problem that the BIOS is required to perform a complicated procedure to determine the cell configuration each time the range registers are initialized.

The second initialization method involves allowing the BIOS within the online system to set initial values in the range registers within the respective chipsets within all the cells, including spare cells that are not incorporated into the online system. The second initialization method is allowed when the chipsets within the cells are designed to support the PCI configuration access mechanism, which is standardized by the PCI specifications; the PCI configuration access mechanism allows the chipset on the spare cell to abort the write access into the range register therein, when the spare cell is not incorporated into the online system. It should be noted that the PCI configuration access mechanism does not allow the chipset to affect the initialization of other chipsets. The second initialization method has an advantage over the first initialization method in terms of simplification of the initialization procedure.

The second initialization method is advantageous if the cells are configured with the same initial values in the range registers within the chipsets thereof. Configuring the different cells with different initial values in the range registers requires determination of the initial values on the cell configuration of the system, and this reduces the advantage of the second initialization method, which eliminates the need for determining cell configuration.

In order to achieve dynamic activation of the spare cell, the initialization of the range registers within the spare cell is desirably performed in an online fashion, that is, without rebooting the operation system operated on the online system; however the aforementioned initialization methods are not suitable for initialization of the range registers within the spare cell in an online fashion because of the following reason. According to the PCI specifications, the access to the offline cell is discarded, and the initialization of the spare cell is therefore allowed only after the spare cell is brought online. However, this may lead to an unsuccessful resource routing because an access request may be issued before the range registers within the spare cell are appropriately initialized.

As far as the inventor's knowledge, no prior art is known which achieves initialization of range registers within the spare cell without rebooting the operating system operated on the online system. Japanese Open Laid Patent Application No. Jp-A 2002-312297 discloses a method of initializing PCI host bus bridge systems. Japanese Open Laid Patent Application No. Jp-A Heisei 8-147111 discloses a method of installing expanded disk devices for disk array apparatuses. Japanese Open Laid Patent Application No. Jp-A Showa 63-182768 discloses a method for determining implemented booting procedures. Japanese Open Laid Patent Application No. Jp-A Heisei 10-333890 discloses a system and method for generating system resident volumes for network systems composed of host terminals. However, none of these documents describes initialization of range registers within chipsets for distributed computer system.

SUMMARY OF THE INVENTION

Therefore, an object of the present invention is to provide a system and method for achieving online initialization of range registers used for resource routing within spare cells, that is, initialization of range registers within spare cells without rebooting the operating system operated on the online system.

In an aspect of the present invention, a distributed computer system is composed of a plurality of cells, a processor, and first and second modules. Each of the cells includes a CPU, a memory, and range registers used for resource routing. At least one cell is used as a spare cell, and the remainder(s) of the cells is activated to provide an online system. The first module is programmed to store a memory region of the online system with initial values to be set into range registers of the spare cell in response to booting the online system. The processor stores the memory within the spare cell with a copy of the initial values stored in the memory region in response to a request for activating the spare cell. The second module is programmed to put the initial values obtained from the copy into the range registers of the spare cell. The first and second modules may include BIOSs.

Preferably, the second module is programmed to generate a grant for activating the spare cell after putting the initial values, and the service processor activates the spare cell in response to the grant received from the second module.

The first module is preferably programmed:

to provide a virtual PCI configuration space within the memory region onto which the range registers of the spare cell are virtually mapped, to generate a destination address from a PCI configuration address destined for the range registers within the spare cell, and to put the initial values into a destination identified by the destination address within the virtual PCI configuration space.

It is also advantageous if the first module is programmed:

to generate an association table indicative of association of the cell with bus numbers, to obtain a bus number associated with the spare cell from the association table, and wherein the PCI configuration address includes the bus number obtained from the association table.

In another aspect of the present invention, a BIOS is provided for a distributed computer system including a plurality of cells each comprising a CPU, a memory, and a chipset containing range registers used for resource routing, the plurality of cells including at least one spare cell, remainder of the cells being activated to provide an online system. The BIOS includes a code module for booting the online system, and a code module for providing initial values to be set into the chipset within the spare cell onto a memory region within the online system in response to booting the online system.

The BIOS preferably further includes a code module for providing a virtual PCI configuration space within the memory region onto which the range registers are virtually mapped, a code module for generating a destination address from a PCI configuration address destined for the range registers within the spare cell, and a code module for putting the initial values into a destination identified by the destination address within the virtual PCI configuration space.

It is also preferable that the BIOS further includes a code module for generating an association table indicative of association of the cell with bus numbers, and a code module for obtaining a bus number associated with the spare cell from the association table, and that the PCI configuration address includes the bus number obtained from the association table.

In still another aspect of the present invention, a service processor firmware is provided for a distributed computer system including a plurality of cells each comprising a CPU, a memory, and a chipset containing range registers used for resource routing, the plurality of cells including at least one spare cell, remainder of the cells being activated to provide an online system. The service processor is composed of a code module for providing a copy of the initial values onto the memory within the spare cell in response to a request for activating the spare cell.

In still another aspect of the present invention, a BIOS is provided for a distributed computer system including a plurality of cells each comprising a CPU, a memory, and a chipset containing range registers used for resource routing, the plurality of cells including at least one spare cell, remainder of the cells being activated to provide an online system. The BIOS is composed of a code module for putting initial values prepared on the memory on the spare cell into the range registers within the chipset on the spare cell in response to a request for activating the spare cell.

In still another aspect of the present invention, a method is provided for operating a distributed computer system including a plurality of cells each comprising a CPU, a memory, and a chipset containing range registers used for resource routing, the plurality of cells including at least one spare cell, remainder of the cells being activated to provide an online system. The method is composed of:

providing initial values to be set into the chipset within the spare cell onto a memory region within the online system in response to booting the online system, providing a copy of the initial values onto the memory within the spare cell in response to a request for activating the spare cell, and putting the initial values obtained from the copy into the range registers within the chipset on the spare cell.

Preferably, the method further includes:

generating a grand for activating the spare cell after putting the initial values, and activating the spare cell in response to the grand received from the second module.

The providing initial values preferably includes:

trying to put the initial values into the range registers within the chipset on the spare cell through accessing a PCI configuration space to which the range registers are mapped, using a PCI configuration address destined for the range registers within the spare cell, and snooping the initial values to store the initial values onto the memory region before the initial values are discarded.

It is also preferable that the method further includes:

providing a memory-mapped virtual PCI configuration space within the memory region onto which the range registers within chipset on the spare cell are virtually mapped, generating a destination address from the PCI configuration address, and putting the initial values into a destination identified by the destination address within the virtual PCI configuration space.

In a preferable embodiment, the method further includes:

generating an association table indicative of association of the cell with bus numbers; and obtaining a bus number associated with the spare cell from the association table. In this case, the PCI configuration address preferably includes the bus number obtained from the association table.

The method preferably includes:

compressing the memory-mapped virtual PCI configuration space, storing the compressed memory-mapped virtual PCI configuration space onto another memory region, and releasing the memory-mapped virtual PCI configuration space from the memory region after the storing.

It is also preferable that the providing the copy of the initial values and the snooping the initial values are achieved by hardware.

In a preferred embodiment, the method preferably includes:

preparing a location of a memory range assigned to an expanded memory on the spare cell within a PCI memory space onto the memory-mapped virtual PCI configuration space, and putting the location obtained from the memory-mapped virtual PCI configuration space into a range register within the chipset on the spare cell. The putting the location is advantageously achieved by hardware.

BRIEF DESCRIPTION OF THE DRAWINGS

FIG. 2 is a set of tables illustrating contents of range registers within chipsets;

FIG. 7 illustrates a format of a PCI configuration address;

FIG. 8 illustrates contents of an association table indicative of an association of cells with bus numbers;

FIG. 9 illustrates a structure of PCI configuration space within the distributed computer system;

FIG. 11 illustrates a format of virtual PCI configuration address;

FIG. 12 illustrates a structure of virtual PCI configuration space within the distributed computer system;

FIG. 16 illustrates a procedure of initializing virtual range registers within a virtual chipset on a virtual cell;

FIG. 17 illustrates a structure of memory-mapped virtual PCI configuration space;

FIG. 18 illustrates a procedure of virtual range registers mapped onto the memory-mapped virtual PCI configuration space;

DESCRIPTION OF THE PREFERRED EMBODIMENTS

Preferred embodiments of the present invention are described below in detail with reference to the attached drawings.

First Embodiment

System Structure

Figure 1:
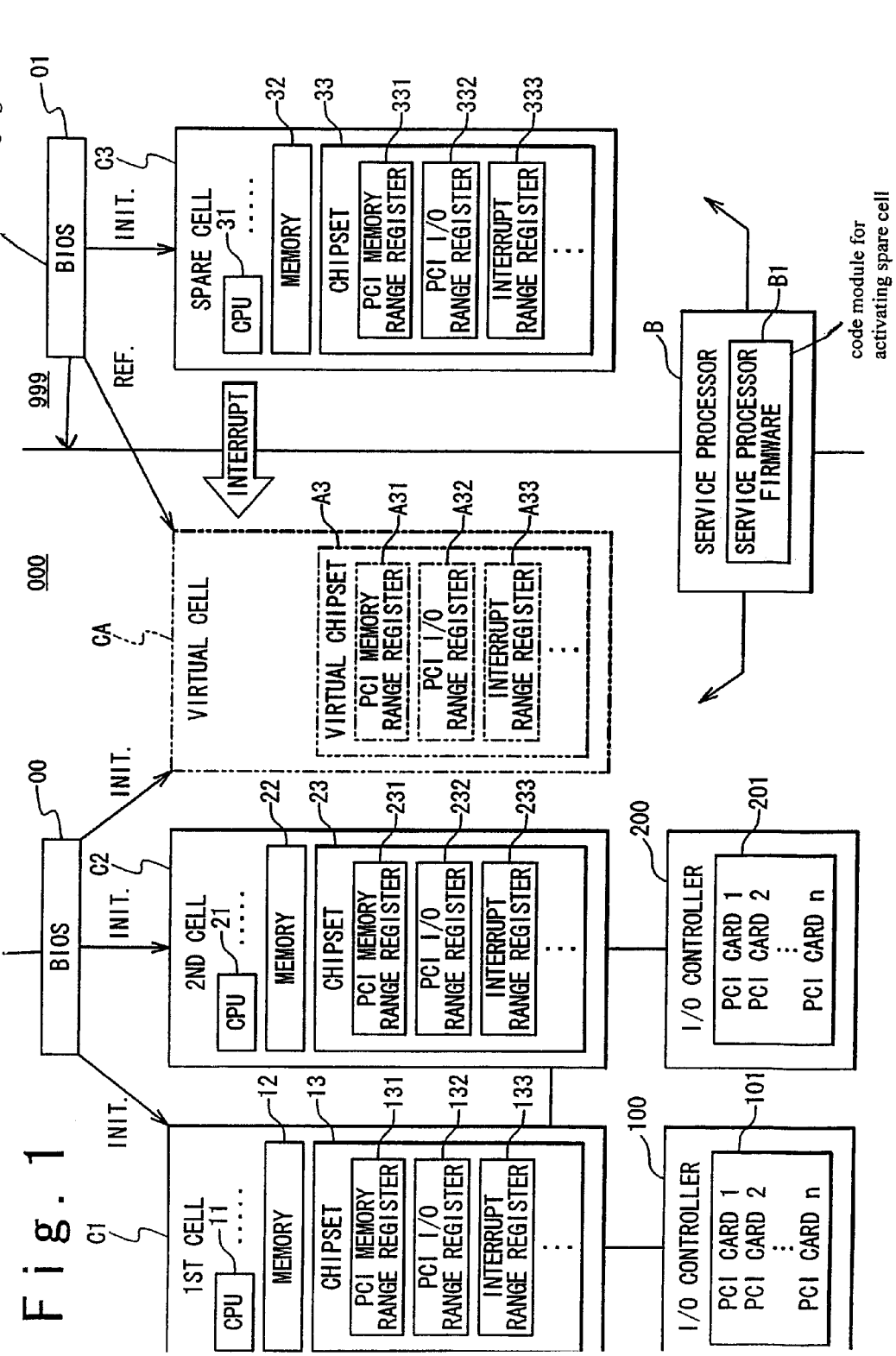
FIG. 1 is a block diagram of a distributed computer system in accordance with the present invention.

In a first embodiment, as shown in FIG. 1, an online system 000 is composed of a BIOS 00, first and second cells C1 and C2, each including a CPU, a memory, and a chipset used for control thereof. Specifically, the first cell C1 is composed of a CPU 11, a memory 12, and a chipset 13. The chipset 13 is equipped with a set of range registers, including a PCI memory range register 131, a PCI I/O range register 132, and an interruption range register 133. Correspondingly, the second cell C2 is composed of a CPU 21, a memory 22, and a chipset 23. The chipset 23 is equipped with a set of range registers, including a PCI memory range register 231, a PCI I/O range register 232, and an interrupt range register 233.

The first and second cells C1 and C2 are connected to first and second I/O controllers 100 and 200, respectively. The first I/O controller 100 functions as an interface for a set of PCI cards 101, while the second I/O controller 200 functions as an interface for a set of PCI cards 120.

The online system 000 additionally includes a spare system 999 and a service processor B. The spare system 999 is composed of a BIOS 01, and a spare cell C3; the spare cell C3 is incorporated into the online system 000 when requested. The spare cell C3 is equipped with a CPU 31, a memory 32 and a chipset 33 for the control thereof. The chipset 33 is composed of a set of range registers, including a PCI memory range register 331, a PCI I/O range register 332, and an interrupt range register 333. The service processor B includes a service processor firmware B1 that controls the distributed computer system. The service processor firmware B1 uploads the BIOS 00 onto the memory 12 and 22 on the cells C1 and C2 for the online system 000, and also uploads the BIOS 01 onto the memory 32 on the spare cell C3 for the spare system 999. Additionally, the service processor firmware B1 controls the cell configuration of the distributed computer system; the service processor firmware B1 brings the spare cell C3 online when requested.

In this embodiment, the cells are configured with the same initial values in the range registers. For example, the PCI memory range registers 131, 231, and 331 are required to contain the same contents. The same goes for the PCI I/O range register 132, 232, and 332, and for the interrupt range register 133, 233, and 333.

It should be noted that the number of the cells constituting the online system 000 and the number of the I/O controllers are not limited to those disclosed herein. Additionally, the number of the spare cells within the spare system 999 may be two or more, and the number of the spare system 999 may be two or more.

Booting and Resource Routing Within the System

Booting the online system 000 and the spare system 999 involves initialization of the cells C1 through C3. The initialization of the cells C1 and C2 is achieved by the BIOS 00, and the initialization of the spare cell C3 is achieved by the BIOS 01. The initialization of the cells C1 through C3 involves determining assignment of resource ranges of the respective resource spaces to the cells C1 through C3, and performing initialization of the range registers within the chipsets 13, 23, and 23 on the cells C1 through C3, including the PCI memory range register 131, 231, 331, the PCI I/O range register 132, 232, 332, and the interrupt range register 133, 233, and 333.

FIG. 2 illustrates the initial values contained in the range registers.

The PCI memory range registers 131, 231, and 331 are used for indicating assignment of PCI memory ranges to the respective cells C1 through Cn within the PCI memory address space. The PCI memory range register 131 is composed of fields containing the locations of the memory ranges assigned to the respective cells C1 through Cn. A field of the PCI memory range register 131 associated with the first cell C1, for example, is used for containing the location of the PCI memory range assigned to the first cell C1, which is occupied by the set of PCI cards 101 connected to the first I/O controller 100 connected to the first cell C1, as illustrated in the top table of FIG. 2; the location is identified by the bottom and top addresses of "X1" and "X1+α1". In other words, the field associated with the first cell C1 indicates that the first cell C1 is an owner cell of the PCI memory range of the PCI memory space identified by the address ranges between "X1" and "X1+α1". The same goes for the remaining fields associated to the remaining cells C2 through Cn.

The remaining PCI memory range registers 231, and 331 are configured with the same initial values as the PCI memory range registers 131.

The PCI I/O range registers 132, 232, and 332 are used for indicating assignment of the PCI I/O ranges to the respective cells within the PCI I/O space. The PCI I/O range registers 132, 232, and 332 identically contain the locations of the PCI I/O ranges assigned to the cells C1 through C3.

The same goes for the interrupt range registers 133, 233, and 333.

Figure 3:
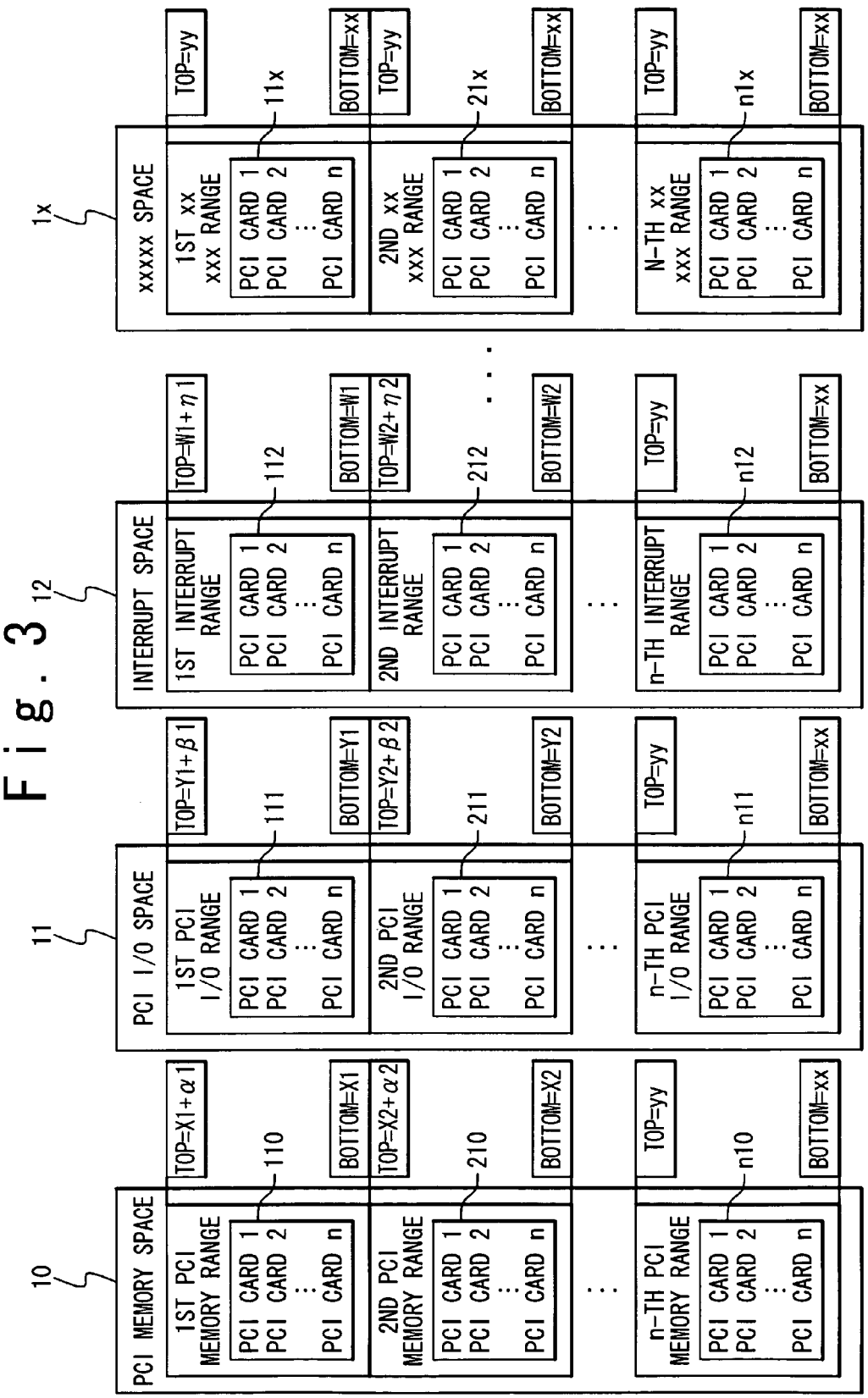
FIG. 3 illustrates a structure of a resource space within the distributed computer system.

FIG. 3 illustrates an exemplary resource assignment of the distributed computer system. The PCI memory space is divided into first to n-th PCI memory ranges, designated by numerals 110 to n10, which are assigned to the cells C1 to Cn, respectively. In other words, the owners of the first to n-th PCI memory ranges 110 to n10 are the cells Cl to Cn, respectively. Correspondingly, the PCI I/O space is divided into first to n-th PCI I/O ranges 111 to n11 whose owners are the cells C1 to Cn, respectively.

Figure 4:
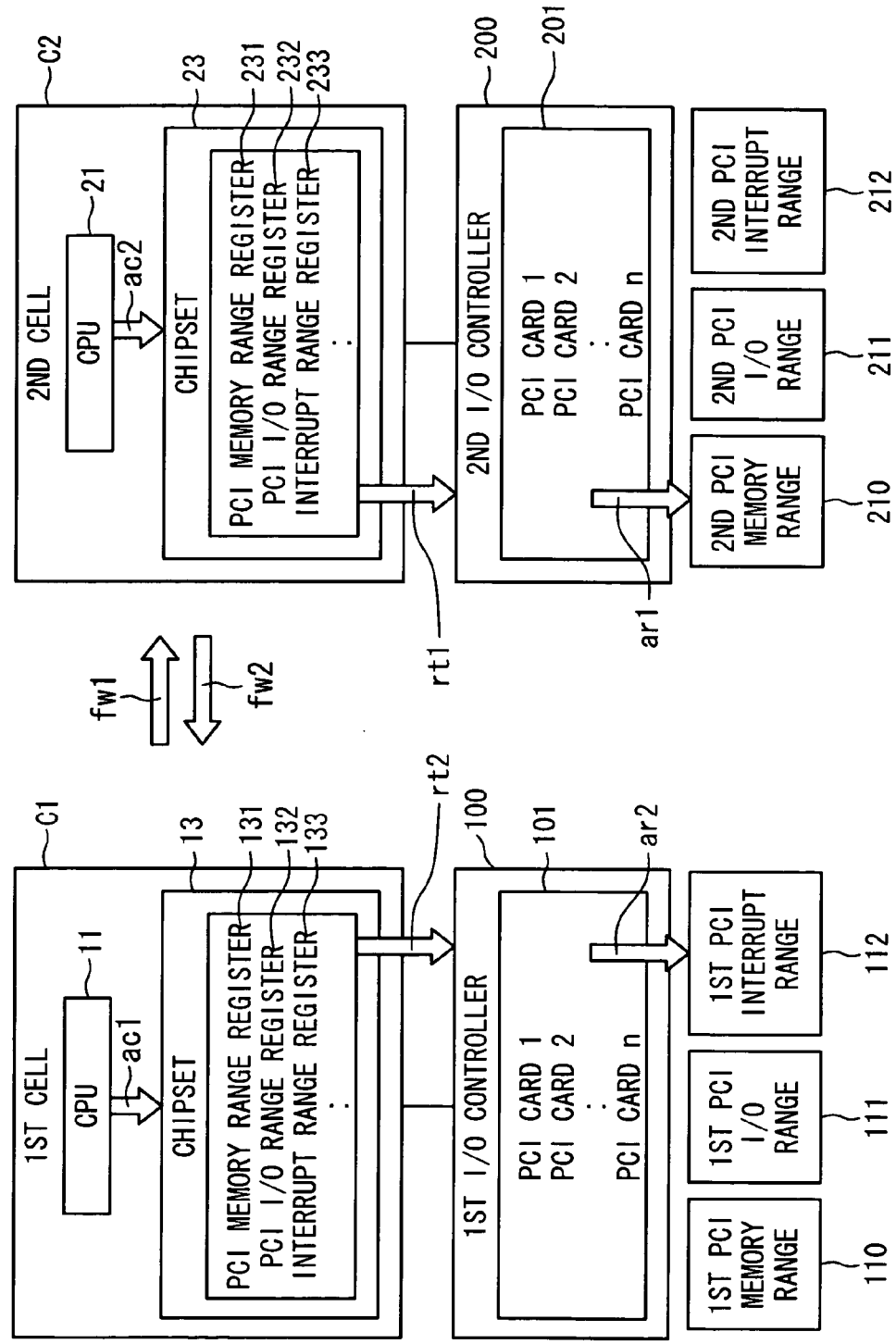
FIG. 4 illustrates a procedure of resource routing using range registers.

The resource routing is achieved using the range registers as described in the following. With reference to FIG. 4, when the CPU 11 on the first cell C1 issues a PCI memory access request ac1, the chipset 13 refers to the PCI memory range register 131 to determine the owner of the memory range for which the PCI memory request ac1 is destined. When the PCI memory access request ac1 is an request for an access to the second PCI memory range 210, for example, the chipset 13 refers to the column associated with the second cell C2 in FIG. 2 to determine that the owner of the second PCI memory range 210 is the second cell C2. Therefore, the chipset 13 forwards the PCI memory access request ac1 to the second cell C2, which is the owner of the second PCI memory range 210, as designated by the arrow fw1 in FIG. 4.

Upon receiving the PCI memory access request ac1, the chipset 23 on the second cell C2 refers to the PCI memory range register 231, which contains the same contents as the PCI memory range register 131. On the basis of the contents within the PCI memory range register 231, the chipset 23 determines that the PCI memory access request ac1 is destined for the PCI memory range whose owner is the second cell C2 itself, that is, the PCI memory range between addresses "X2" and "X2+α2". Therefore the chipset 23 routes the PCI memory access request ac1 to the second I/O controller 200, which is connected to the second cell c2, as designated by an arrow rt1.

In summary, an access to a specific resource range is achieved as follows; when a CPU issues an access request for the target resource range, the owner of the target resource range is determined by referring the associated range register. The access request is then forwarded to the chipset within the owner cell. The chipset within the owner cell then routes the access request to an I/O controller associated with the target resource range. This allows the issuing CPU to access the target resource range.

Referring to FIG. 9, the accesses to the range registers within the chipsets 13, 23, and 33 are achieved using a PCI configuration space ccs. The range registers within the respective chipsets are mapped to the PCI configuration space so as to allow the PCI configuration space to be addressed by a PCI configuration address pca, whose format is shown in FIG. 7. A PCI configuration address includes an enable bit, reserved bits, a bus number, a device number, a function number, and a register number. An access to a specific range register involves accessing a location identified by the associated PCI configuration address.

Referring to FIG. 8, the mapping of the range registers to the PCI configuration space ccs is achieved by generating an association table cbt that indicates an association of the cells with the bus numbers. In this embodiment, the first and second cells C1 are assigned with bus numbers "BUSNO1", and "BUSNO2", respectively. Additionally, the spare cell C3 is assigned with a bus number "BUSNOA".

Figure 6:
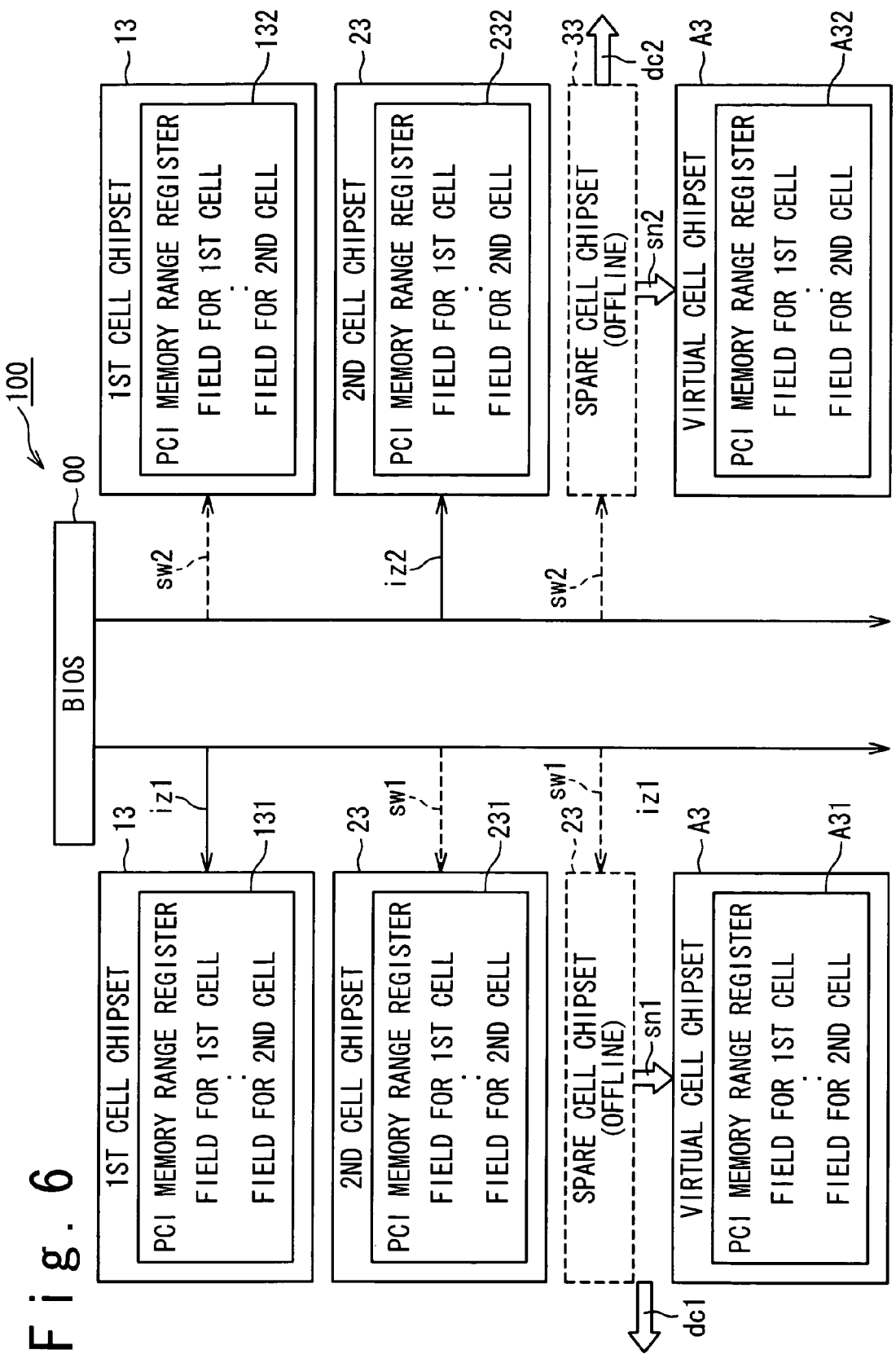
FIG. 6 illustrates a procedure of initializing range registers.

As shown in FIG. 6, the aforementioned initialization of the range registers within the chipset 13 and 23 is achieved through accessing the associated locations within the PCI configuration space ccs using the associated PCI configuration addresses.

The initialization of the range registers is performed in units of the fields within the range registers. In order to initialize the field within the PCI range register 131 associated with the PCI memory range 110, whose owner is the cell Cl, for example, the BIOS 00 generates an PCI configuration address pca including the bus number "BUSNO1", associated with the cell C1, and writes the desired initial values, that is, the bottom and top addresses "X1" and "X1+α1", into the destination identified by the PCI configuration address pca.

The initialization of the target field of the range register within the associated chipset is followed by shadowing destined for the fields within the range registers within the chipsets on the different cells, including the spare cells. For example, the initialization of the field within the PCI range register 131 associated with the PCI memory range 110 is followed by shadowing destined for the corresponding fields of the PCI range registers 231, and 331 on the cell C2 and C3. In other words, the BIOS 00 sets the same initial values to the corresponding fields of the PCI range register 231 and 331 within the chipsets 23 and 33 on the cells C2 and C3, as designated by arrows sw1.

Although the BIOS performs the initialization and shadowing for the offline spare cell C3, the initialization and shadowing for the offline spare cell C3 using the PCI configuration address pca are discarded, as indicated by arrows dc1 and dc2, because the access to the offline location is not allowed by the PCI configuration access mechanism standardized by the PCI specifications.

Figure 5:
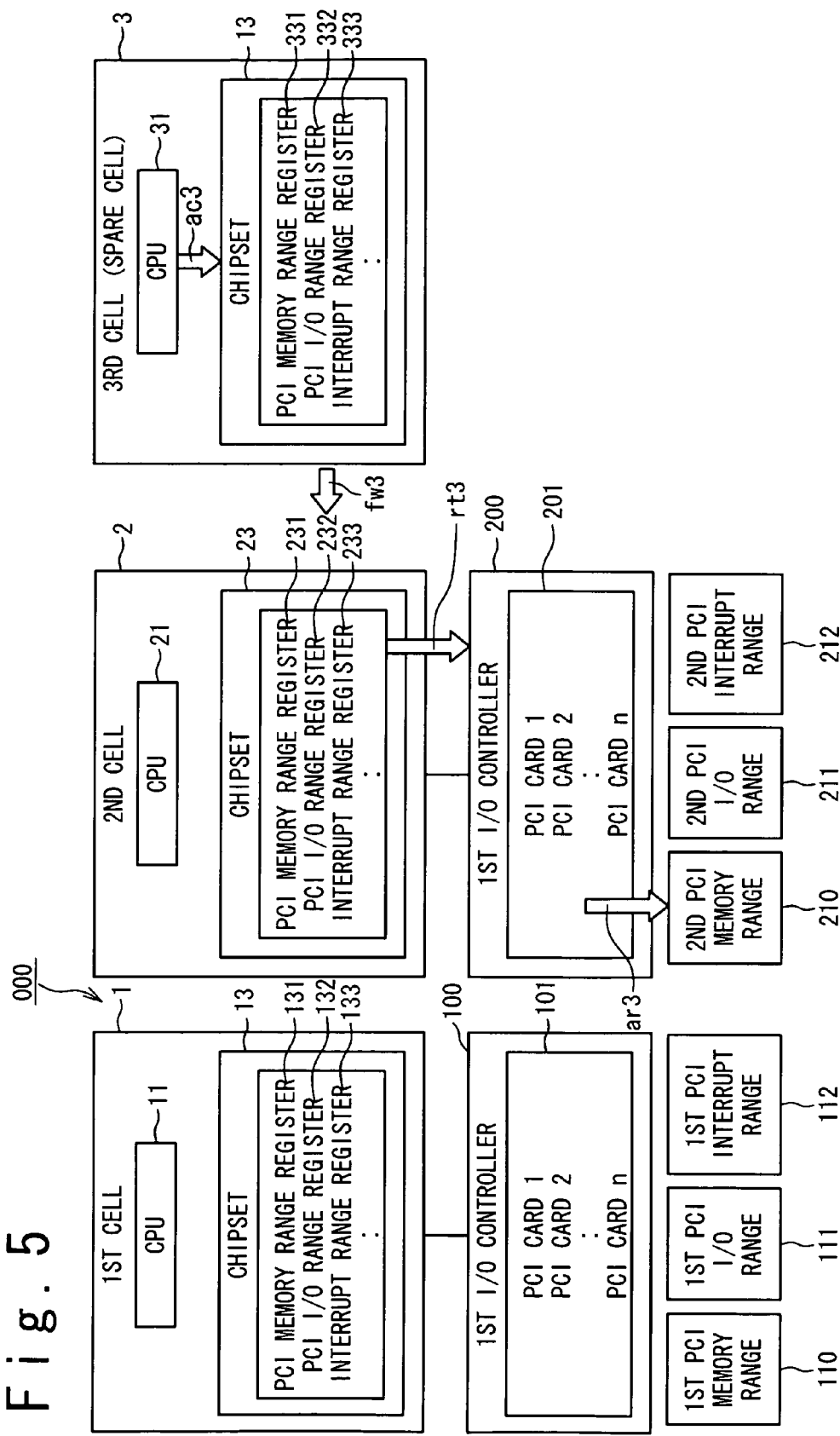
FIG. 5 illustrates a procedure of resource routing after activating a spare cell.

This is because a special technique for initializing spare cells is required. Unless the range registers within the spare cell C3 are not appropriately initialized, resource routing in connection with the spare cell C3 is not normally performed. As shown in FIG. 5, for example, when the CPU 31 on the spare cell C3 issues an PCI memory access request ac3 for the second PCI memory range 210, the PCI memory access request ac3 is to be forwarded to the cell C2, which is the owner of the second PCI memory range 210. In order to appropriately forward the PCI memory access request ac3, the PCI memory range register 331 is appropriately initialized before the spare cell C3 is brought online.

The following is a description of a technique for initializing the range registers within the chipsets on the spare cells.

Initialization of Range Registers on Spare Cell

As shown in FIG. 1, the initialization of the range registers within the chipset 33 on the spare cell C3 is performed by defining a "virtual cell" CA within the online system 000 in place of the spare cell C3. The BIOS 00 initializes the virtual cell CA when the online system 000 is booted. The initialization of the virtual cell CA involves initializing "virtual range registers" within a "virtual chipset" A3 on the virtual cell CA.

With reference to FIG. 6, the initialization of the "virtual range registers" are achieved by snooping the desired initial values to be set into the spare cell C3 before the initialization or shadowing is discarded, and setting the snooped initial values to the corresponding field of the virtual range registers within the virtual chipset A3. For example, immediately after performing the shadowing sw1 for the spare cell C3, the initial values to be set to the corresponding field of the PCI memory range register 331 are snooped, and the snooped initial valued are set into a virtual PCI memory range register within the virtual chipset A31 on the virtual cell CA.

More specifically, the initialization of the "virtual range registers" within the "virtual chipset" A3 on the virtual cell is achieved by preparing a virtual cell table and defining a virtual PCI configuration space addressable by virtual PCI configuration addresses.

Figure 10:
FIG. 10 illustrates contents of a virtual cell table.

FIG. 10 illustrates contents of the virtual cell table, designated by numeral vct. The virtual cell table vct includes entries, each including a physical cell number, a virtual cell flag, and a bus number. The physical cell number identifies a cell within the computer system. The virtual cell flag is representative of whether the associated cell is online or not; the value "0" represents the associated cell is online, while the value "1" represents the associated cell is offline. When booting the online system 000, the BIOS 00 defines the virtual cell CA for the spare cell C3, which is potentially brought online, and virtually assigns a bus number "BUSNOA", which is identical to the bus number assigned to the spare cell C3 (See FIG. 8). The BIOS 00 then prepares the entry associated with the virtual cell CA, including a physical cell number of "3", a virtual cell flag of a value "1", and a bus number of "BUSNOA". The association of the spare cell C3 and the virtual cell CA is represented by assigning the same bus number "BUSNOA" to the spare cell C3 and the virtual cell CA in the association table cbt shown in FIG. 8 and the virtual cell table vct shown in FIG. 10.

FIG. 12 illustrates the structure of the virtual PCI configuration space, designated by numeral vccs. The virtual range registers are mapped into the virtual PCI configuration space vCCs. The virtual PCI configuration space vccs is addressable by virtual configuration addresses, designated by numeral vca in FIG. 11. As shown in FIG. 11, the format of the virtual configuration address vca is identical to that of the PCI configuration address pca shown in FIG. 7.

Initialization and shadowing destined for a desired virtual range register is achieved using the virtual cell table vct as described in the following. When an request for initialization or shadowing destined for the spare cell C3 is issued, the BIOS 00 snoops the destination PCI configuration address and the initial values to be set to the destination. The BIOS 00 then obtains the bus number associated with the spare cell C3 from the virtual cell table vct, that is, the bus number of "BUSNOA", and generates a virtual configuration address so as to include the obtained bus number. After generating the virtual configuration address, the BIOS 00 writes the snooped initial values into the destination within the virtual PCI configuration space vccs identified by the generated virtual configuration address.

The virtual PCI configuration space vccs is mapped to a predetermined memory region of the memories 12 and 22 within the online system 000, and the virtual PCI configuration space vccs prepared in the memories 12 and 22 is referred to as a memory-mapped virtual PCI configuration space mvccs as shown in FIG. 17. The memory-mapped virtual PCI configuration space mvccs is addressable by memory addresses. When booting the online system 000, the BIOS 00 prepares the memory-mapped virtual PCI configuration space mvccs in the memory space within the online system 000, which may include the memories 12 and 22. The initialization and shadowing destined for the range registers, including the virtual range registers, are then achieved through generating the associated memory addresses on the PCI configuration addresses or the virtual PCI configuration addresses, and accessing the memory-mapped virtual PCI configuration space mvccs using the generated memory addresses.

Activation of Spare Cell

As shown in FIG. 1, activation of the spare cell C3, that is, incorporation of the spare cell C3 into the online system 000, is controlled by the service processor firmware B1 within the service processor B, and the BIOS 01 within the spare system 999.

In order to achieve the activation of the spare cell C3, the service processor firmware B1 provides access to the virtual cell CA within the online system 000 for the BIOS 01 within the spare system 999. When activation of the spare cell C3 is requested, the service processor firmware B1 copies the memory-mapped PCI configuration space mvccs (See FIG. 17), which is prepared in the predetermined region of the memories 12 and 22, onto a predetermined region within the memory 32 on the spare cell C3. This allows the BIOS 01 to refer to the memory-mapped PCI configuration space mvccs, that is, the virtual range registers within the virtual cell CA.

The BIOS 01, which is operated on the CPU 31 on the spare cell C3, then initializes the range registers within the chipset 33 on the spare cell C3 using the copy of the memory-mapped PCI configuration space mvccs, which is prepared on the memory 32. The BIOS 01 obtains the initial values to be set into the range registers within the chipset 33 on the spare cell C3 from the copy of the memory-mapped PCI configuration space mvccs, including the initial values to be set into the PCI memory register 331, the PCI I/O range register 332, and the interrupt range register 333.

After the BIOS 01 initializes the range registers within the chipset 33 on the spare cell C3, the BIOS 01 issues a grant for incorporation of the spare cell into the online system 000.

In response to the grant for incorporation received from the BIOS 01, the service processor firmware B1 incorporates the spare cell C3 into the online system 000.

It is of importance that the spare cell C3 is brought into online after completing the initialization of the range registers within the chipset 33. If the spare cell C3 is brought into online before initialization of the range registers thereof, it may cause an unsuccessful resource routing because a resource routing may be requested in connection of the spare cell C3 immediately after the activation of the spare cell C3 before the range registers are appropriately initialized.

In summary, the distributed computer system illustrated in FIG. 1 achieves the initialization of the range registers within the chipset 33 on the spare cell C3 through defining the virtual cell CA for the spare cell C3, which includes the virtual chipset A3 with the virtual range registers, and thereby achieves activation of spare cell C3 without rebooting the operation system operated on the online system 000. The virtual range registers within the virtual chipset A3 are mapped onto the memory-mapped virtual PCI configuration space mvccs, which is prepared in the predetermined memory region within the memories 12 and 22. When the activation of the spare cell C3 is requested, the service processor firmware B1 copies the memory-mapped virtual PCI configuration space mvccs onto the predetermined region of the memory 32 on the spare cell C3, and the BIOS 01 initializes the range registers within the chipset 33 using the initial values described in the prepared copy of the memory-mapped virtual PCI configuration space mvccs. The service processor firmware B1 then activates the spare cell C3. This procedure eliminates a need for rebooting the operating system operating on the online system 000 before initializing and activating the spare cell C3.

Detailed Procedure of Initialization of Spare Cell

When the online system 000 is initially booted, the BIOS 00 within the online system 000 prepares the association table cbt (see FIG. 8), and the virtual cell table vct (see FIG. 10).

Figure 13:
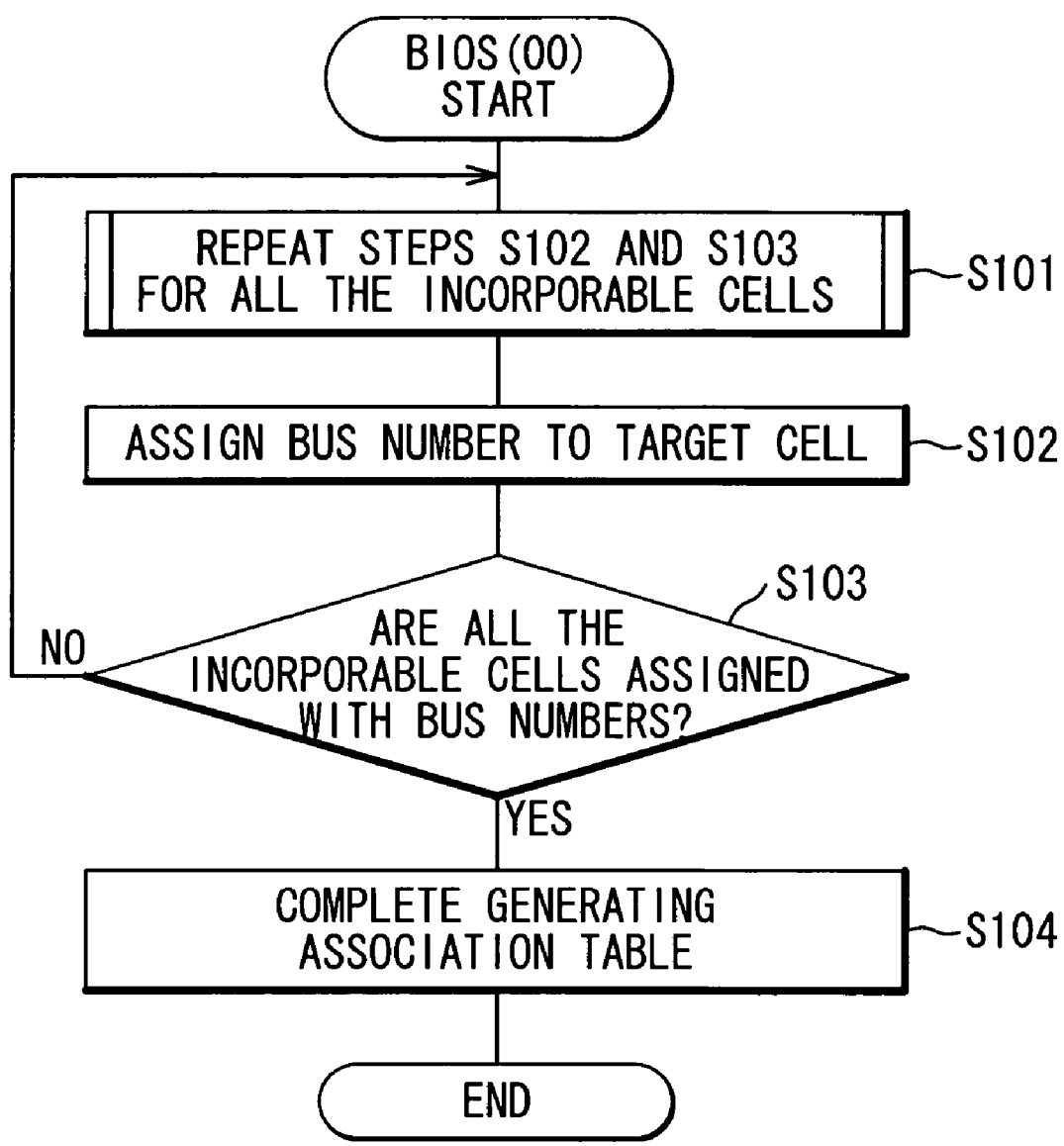
FIG. 13 illustrates a procedure of generating the association table.

FIG. 13 illustrates the procedure of the preparation of the association table cbt. The BIOS 00 repeats Steps S102 and S103 for all the cells, including the spare cell C3, as designated by Step S101. Specifically, at Step S102, the BIOS 00 assigns a target one of the cells with a bus number, and determines whether all the cells are assigned with the bus numbers at Step S103. If not so, the BIOS 00 selects another cell and repeats Step S102 for the selected cell. This results in that the bus numbers "BUSNO1" and "BUSNO2" are assigned to the first and second cells C1 and C2, respectively, and the bus number "BUSNOA" is assigned to the spare cell C3.

The BIOS 00 generates the association table cbt indicative of the association of the bus numbers with the cells C1 through C3 at Step S104, and completes the procedure of generating the association table cbt. The BIOS contains the association table cbt.

Figure 14:
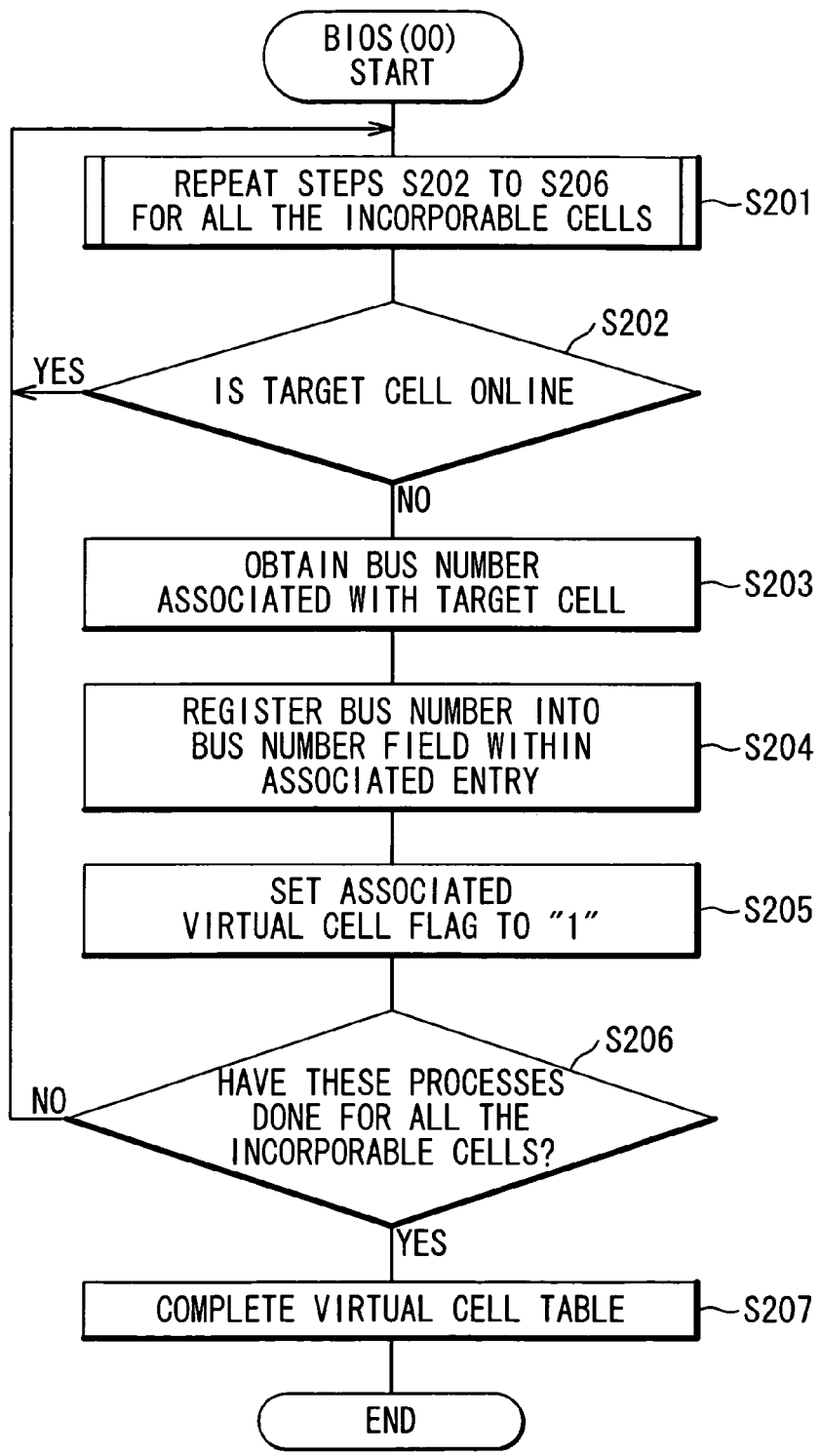
FIG. 14 illustrates a procedure of generating the virtual cell table.

FIG. 14 illustrates the procedure of the preparation of the virtual cell table vct. The BIOS 00 repeats Steps S202 to S206 for all the cells, including the spare cell C3, as designated by Step S201. Specifically, The BIOS 00 determines whether a target one of the cells C1 to C3 is online or not at Step S02. The determination method may include issuing an inquiry to the service processor firmware B1, or obtaining cell configuration information from the service processor firmware B1. Instead, the determination may be achieved on the basis of whether a direct access to hardware on the target cell, such as physical registers, is successfully completed.

If the target cell is online, the BIOS 00 resets the virtual cell flag associated with the target cell to value "0", and repeats Step S202 for another cell.

This procedure allows the BIOS 00 to recognize that the spare cell C3 is offline. In response to the spare cell C3 being offline, the BIOS 00 obtains the bus number "BUSNOA", which is associated with the spare cell C3, from the association table cbt at Step S203.

At Step 204, the BIOS 00 then registers the obtained bus number "BUSNOA" into the virtual bus number field of the entry associated with the spare cell C3 within the virtual cell table vct. This is followed by setting the virtual cell flag associated with the spare cell C3 within the associated entry to "1" at Step S205.

This procedure allows the entry associated with the spare cell C3 to indicate that the BIOS 00 defines the virtual cell CA for the spare cell C3, and the virtual bus number associated with the virtual cell CA is "BUSNOA", which is contained in the virtual bus number field of the associated entry.

At Step S206, the BIOS 00 determines whether Steps S202 through S205 are performed for all the cells, including the spare cell C3. If not so, the procedure is jumped to Step S202.

After performing Steps S202 through S205 for all the cells, the BIOS 00 completes the generation of the virtual cell table vct at Step S207.

After the preparation of the association table cbt, and the virtual cell table vct, the BIOS 00 starts initializing the range registers of the chipsets on all the cells, including the spare cell C3, using the association table cbt. The initialization (and shadowing) is achieved by accessing the PCI configuration space pcs using PCI configuration addresses generated on the basis of the virtual cell table vct.

Figure 15:
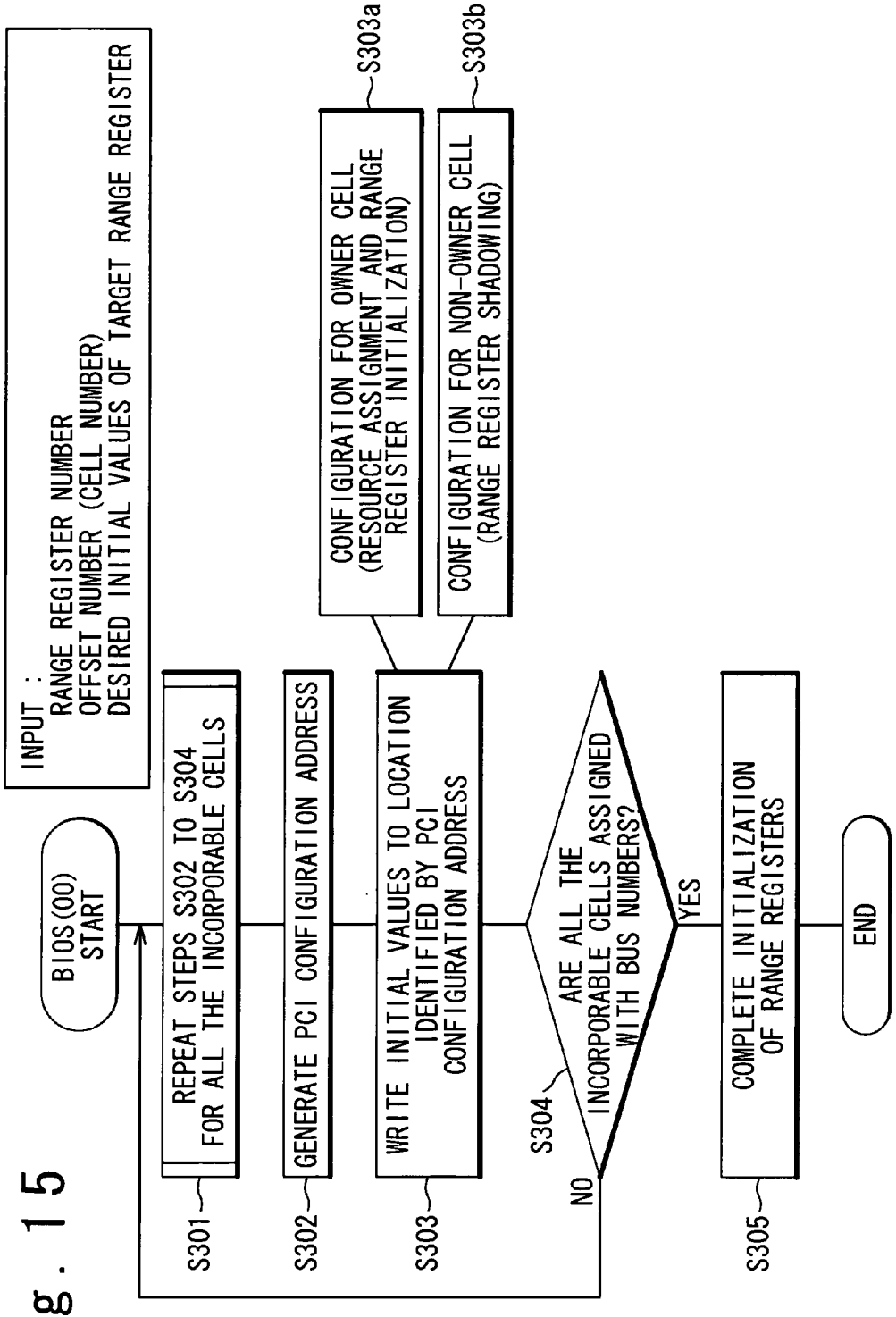
FIG. 15 illustrates a procedure of initializing range registers within chipsets for all the incorporable cells.

FIG. 15 illustrates the procedure of the initialization (and shadowing) destined for the cells C1 to C3. Initializing and shadowing desired fields of desired range registers begins with preparing three kind of input values: a range register number identifying the desired range registers, an in-register offset number identifying the desired field within the desired range register (that is, the owner of the associated resource range), and initial values to be set into the desired fields. For initialization and shadowing of the fields within the PCI memory range registers 131 to 331 associated with the PCI memory range 110, whose owner is the cell C1 identified by the cell number "1", for example, the prepared range register number is "R1", which is associated with the PCI memory range registers 131 to 331, and the prepared in-register offset number is "1" which identifies the owner of the PCI memory range 110. Additionally, the prepared initial values includes the bottom and top addresses of "X1" and "X1+α1" identifying the first PCI memory range 110.

After preparing the input values, the BIOS 00 repeats Steps S301 through S304 for all the potentially incorporable cells, as designated by Step S301.

At Step S302, the BIOS 00 selects a target cell out of all the cells C1 to C3, and generates a PCI configuration address to include the bus number associated with the target cell, and the prepared register number; the bus associated number is obtained from the association table cbt. The generated PCI configuration address is used for addressing the PCI configuration space. For initialization of the PCI memory range register 131 within the chipset 13 on the first cell C1, for example, the BIOS 00 obtains the bus number "BUSNO1", which is associated with the cell C1, from the association table cbt, and generates a PCI configuration address including the obtained bus number of "BUSNO1", a device number of "D1", a function number of "F1", which are associated with the PCI memory range register 131, and the register number of "R1" identifying the PCI memory range register 131.

The BIOS 00 then generates a destination address by adding the in-register offset number to the generated PCI configuration address. For the initialization of the field associated with the PCI memory range 110 within the PCI memory register 131, a destination address is obtained by adding the in-register offset number of "1" to the generated PCI configuration address.

The BIOS 00 then writes the prepared initial values into the destination identified the generated destination address at Step S303.

At Step S304, the BIOS 00 determines whether Steps S302 and S303 are performed for all the cells, including the spare cell C3. If not so, the procedure is jumped to Step S302 after selecting another target cell.

After performing Steps S302 and S303 for all the incorporable cells, the BIOS 00 completes the initialization and shadowing destined for the cells.

It should be noted that the write operations implemented at Step S303 include initialization and shadowing as designated by numerals S303a and S303b. In the case when the in-register offset number is identical to the cell number used for obtaining the associated bus number, the associated write operation achieves initialization of the desired field of the desired range register. For the write operation destined for the field associated with the PCI memory range 110 within the PCI memory range register 131 on the cell C1, for example, both of the cell number used for obtaining the bus number, and the in-register offset number identifying the field associated with the PCI memory range 110 are identically "1". This procedure achieves initialization of the field associated with the PCI memory range 110 within the PCI memory range register 131 on the owner cell C1 of the PCI memory range 110, as designated by the arrow iz1 in FIG. 6, and thereby achieves assignment of the PCI memory range 110 identified by the prepared initial values to the owner cell C1.

In contrast, in the case when the in-register offset number is different from to the cell number used for obtaining the associated bus number, the associated write operation achieves shadowing destined for the desired field of the desired range register. For the write operation destined for the field associated with the PCI memory range 110 within the PCI memory range register 231 on the cell C2, for example, the cell number used for obtaining the bus number is "2", while the in-register offset number identifying the field associated with the PCI memory range 110 is "1". This procedure achieves shadowing destined for the field associated with the PCI memory range 110 within the PCI memory range register 231 prepared on the non-owner cell of the PCI memory range 110, as designated by the arrow sw1 in FIG. 6.

Although the procedure of FIG. 15 includes initialization and shadowing destined for the offline spare cell C3, the initialization and shadowing for the spare cell C3 are discarded in accordance with the PCI configuration access mechanism standardized by the PCI specifications.

In this embodiment, the BIOS 00 snoops the PCI configuration address and the initial values prepared for the spare cell C3, and writes the snooped initial values into the virtual range registers within the virtual cell CA, which are mapped onto the virtual PCI configuration space vccs; the access to the desired location within the virtual PCI configuration space vccs is achieved using the virtual configuration address generated from the snooped PCI configuration address. This procedure is inserted before Step S303 of FIG. 15.

FIG. 16 illustrates the procedure of initializing the virtual range registers through accessing the virtual PCI configuration space vccs. The initialization of the virtual range registers requires preparation of four input values: a cell number identifying the virtual cell on which the target virtual range register is prepared, a range register number identifying the target virtual range register, an in-register offset number identifying the target field within the target virtual range register, and the initial values to be set into the target field within the target virtual range register. In order to prepare the location of the first PCI memory range 110, whose owner is the first cell Cl, for the field associated with the first cell Cl within the PCI memory range register 331 on the spare cell C3, the input values includes the cell number of "3", the range register number of "R1" (see FIG. 9 and FIG. 12), the in-register offset number of "1" (see FIG. 2), and initial values indicative of the location of the first PCI memory space 110, including the bottom and top addresses of "X1" and "X1+α1".

Firstly, the BIOS 00 determines whether the cell identified by the prepared cell number is a virtual cell by referring to the virtual cell table vct at Step S401. When the prepared cell number is "3", which is associated with the offline spare cell C3, the BIOS 00 refers to the entry associated with the cell number of "3". The BIOS 00 determines whether the virtual cell flag within the associated entry is set to "1". If so, the BIOS 00 determines that the spare cell C3 is offline, and obtains the associated virtual bus number from the virtual bus number field within the associated entry. In this embodiment, this results in that the BIOS 00 obtains the virtual bus number "BUSNOA", which is associated with the spare cell C3. If the virtual cell flag within the associated entry is reset to "0", the procedure for initializing the virtual range registers is aborted at Step S404.

When the cell identified by the prepared cell number is a virtual cell, the BIOS 00 generates a virtual PCI configuration address in accordance with the format shown in FIG. 11 at Step S402. In the case when the prepared input values includes the cell number of "3", and the range register number of "R1", for example, the BIOS 00 generates a virtual PCI configuration address including the bus number of "BUSNOA", which is associated with the cell number of "3", the device number of "D1", the function number of "F1", and the register number of "R1", which are associated with the PCI memory range register 331. The BIOS 00 then adds the in-register offset number to the generated virtual PCI configuration address to generate the destination address.

At Step S403, the BIOS 00 then writes the prepared initial values into the destination identified by the destination address generated at Step S402. This process is equivalent to the write operation of the initial values into the field associated with the first cell within the PCI memory range register A31 within the chipset A3 on the virtual cell CA, as designated by the arrow sn1 in FIG. 6.

The BIOS 00 then completes the initialization of the target virtual range register at Step S404.

Specifically, the access to the virtual range registers is achieved through accessing the memory-mapped virtual PCI configuration space mvccs shown in FIG. 17, which has a initial address of "X". The memory-mapped virtual PCI configuration space mvccs associated with the spare cell C3 is mapped onto the memory region identified by an address obtained by the initial address of "X" and the cell number of "3" associated with the spare cell C3.

FIG. 18 illustrates the detailed procedure of initialization of the virtual range registers implemented at Step S403 of FIG. 16. The access to the memory-mapped virtual PCI configuration space mvccs requires two input values: the virtual PCI configuration address generated at Step S402, and the initial values to be set to the target virtual range register.

At Step S501, the BIOS 00 obtains the virtual bus number from the virtual PCI configuration address, and then obtains the cell number associated with the obtained virtual bus number from the virtual cell table vct shown in FIG. 10. It should be noted that the bits 16 to 23 of the virtual PCI configuration address are indicative of the virtual bus number as illustrated in FIG. 11.

As shown in FIG. 18, at Step S502, the BIOS 00 then calculates a base address from the initial address of "X" of the memory-mapped virtual PCI configuration space mvccs (see FIG. 17), and the cell number obtained at Step S502. Specifically, the base address is equal to the initial address plus an offset value which is obtained by multiplied the cell number by the size of the complete set of the virtual range registers of the each virtual cell CA, which are mapped onto the memory-mapped virtual PCI configuration space mvccs. The size of the complete set of the virtual range registers is obtained the number of the bits below the bus number field of the virtual PCI configuration address. In this embodiment, as shown in FIG. 10, the number of the bits below the bus number field is 16, and thus, the size of the complete set of the virtual range registers is 64 kbytes. In the case when the cell number of "3" is obtained at Step S501, the offset value is 192 (=64×3) kbytes, and the base address obtained at Step S502 is the sum of the initial address "X" and the offset value of 192 kbytes.

At Step S503, the BIOS 00 then calculates a destination address by adding the base address obtained at Step S502 with the value of the lower 16 bits of the virtual PCI configuration address, which is prepared as one of the input values. For the virtual PCI configuration address identifying the field associated with the first cell C1 within the PCI memory range register A31 in the virtual PCI configuration space vccs, for example, the prepared virtual PCI configuration address is composed of the bus number "BUSN0A", the device number of "D1", the function number of "F1", and the in-register offset number "1", and the BIOS 00 calculates the destination address by adding the base address obtained at Step S502 with the lower 16 bits of the virtual PCI configuration address, the lower 16 bits including the device number of "D1", the function number of "F1", and the in-register offset number "1".

At Step S504, the BIOS 00 writes the prepared initial values into the destination identified by the destination address calculated at Step S503. The BIOS 00 then completes the initialization procedure at Step S505.

As thus described, the BIOS 00 prepares the memory-mapped virtual PCI configuration space mvccs over one or more of the memories within the online system 000, and contains initial values of the virtual range registers within the memory-mapped virtual PCI configuration space mvccs.

The initialization of the spare cell C3 involves preparing a copy of the memory-mapped PCI configuration space mvccs (See FIG. 17) onto a predetermined region within the memory 32 on the spare cell C3 by the service processor firmware B1, and initializing the range registers within the chipset 33 on the spare cell C3 using the copy of the memory-mapped PCI configuration space mvccs. The BIOS 01 puts the initial values obtained from the copy of the memory-mapped PCI configuration space mvccs into the range registers within the chipset 33 on the spare cell C3 to complete the initialization. After the BIOS 01 initializes the range registers within the chipset 33 on the spare cell C3, the BIOS 01 issues a grant for incorporation of the spare cell into the online system 000. In response to the grant for incorporation received from the BIOS 01, the service processor firmware B1 incorporates the spare cell C3 into the online system 000.

SUMMARY

As thus described, the distributed computer system in this embodiment achieves initialization of the spare cell C3 before activation of the spare cell C3 without rebooting the operating system on the online system 000 through defining the "virtual" cell CA. The BIOS 00 prepares the virtual range registers of the "virtual" cell CA within the memory-mapped virtual PCI configuration space mvccs over one or more of the memories within the online system, and initializes the virtual range registers. When the spare cell C3 is activated, the service processor firmware B1 prepares the copy of the memory-mapped virtual PCI configuration space mvccs over the memory 32, and the BIOS 01 within the spare system 999 initializes the range registers within the chipset 33 within the spare cell C3 using the copy of the memory-mapped virtual PCI configuration space mvccs. This procedure effectively achieves initialization of the spare cell C3 before activation of the spare cell C3 without rebooting the operating system.

Second Embodiment

One drawback of the distributed computer system in the first embodiment is that the memory-mapped virtual PCI configuration space mvccs consumes considerable memory space within the online system 000. In detail, the memory size required to the memory-mapped virtual PCI configuration space mvccs associated with each virtual cell CA is 64 kbytes, which depends on the number of bits of the remaining portion of the virtual PCI configuration address other than the bus number field; in this embodiment, as shown in FIG. 11, the remaining portion includes bits 15 through 0 and thus the number of bits of the remaining portion is 16. This implies the required memory size for each virtual cell CA is 64 kbytes, which is equal to 2 to the 16th power.

Figure 19:
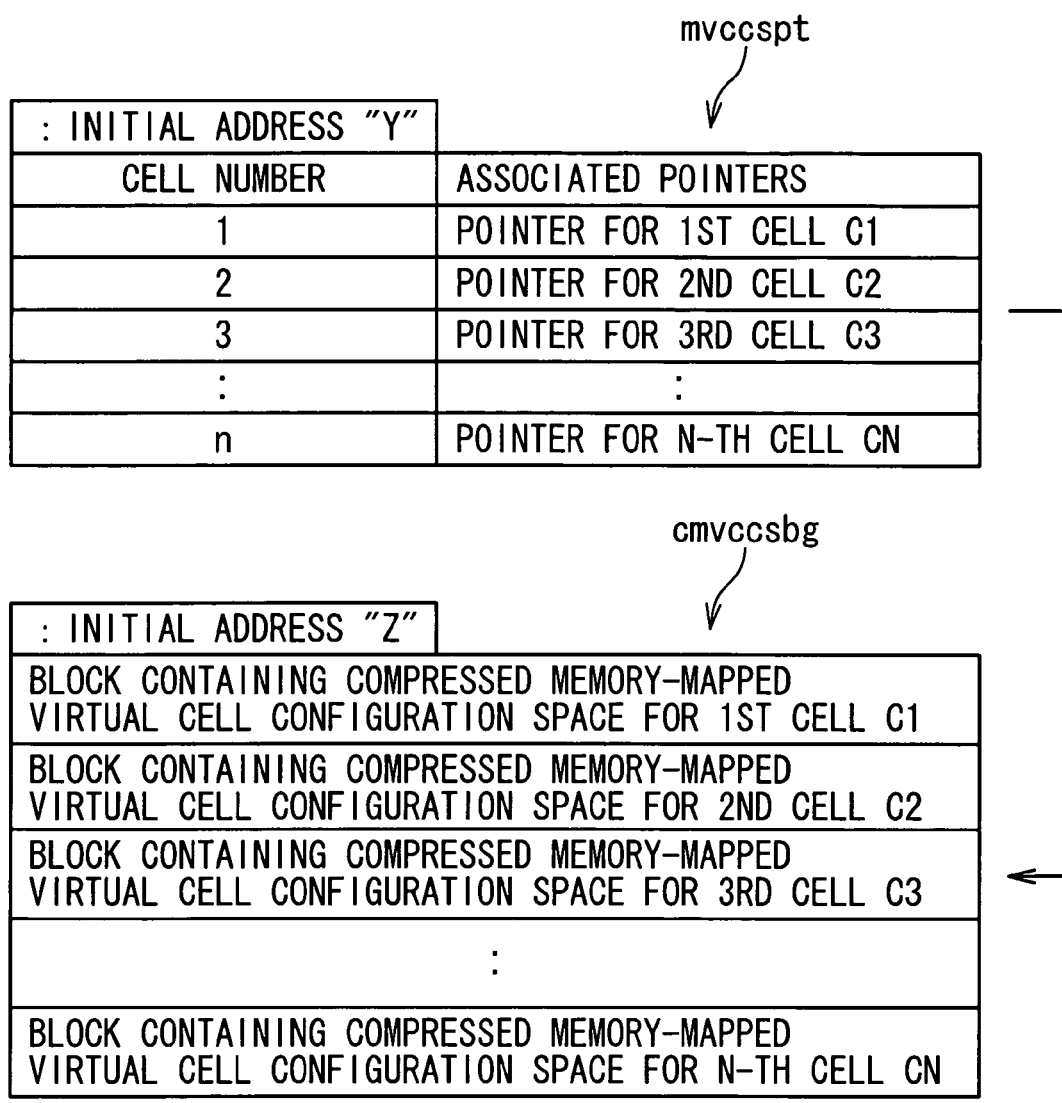
FIG. 19 illustrates structures of pointer tables and compressed virtual PCI configuration space blocks.

In order to reduce the required memory size for the memory-mapped virtual PCI configuration space mvccs, the memory-mapped virtual PCI configuration space mvccs for each virtual cell CA is compressed within the memory region as shown in FIG. 19. Specifically, the BIOS 00 prepares a pointer table mvccspt having an initial address of "Y" and a set of compressed virtual PCI configuration space blocks cmvccsbg which has an initial address of "Z" in the memory region within the online system 000. The BIOS 00 compresses the memory-mapped virtual PCI configuration space mvccs associated with the spare cell C3, after completing initialization of the virtual range registers within the memory-mapped virtual PCI configuration space mvccs, and stores the compressed memory-mapped virtual PCI configuration space into one of the blocks cmvccsbg. The BIOS 00 then stores the address of the block containing the compressed memory-mapped virtual PCI configuration space into an entry of the pointer table mvccspt associated with the spare cell C3. After storing the address, the BIOS 00 releases the memory region occupied by the memory-mapped virtual PCI configuration space mvccs. This procedure effectively reduces the memory size required for storing the memory-mapped virtual PCI configuration space mvccs.

Third Embodiment

In a third embodiment, snooping the initial values to be set to the virtual range registers and copying the memory-mapped virtual PCI configuration space mvccs are performed by hardware in place of the BIOS 00.

Figure 20:
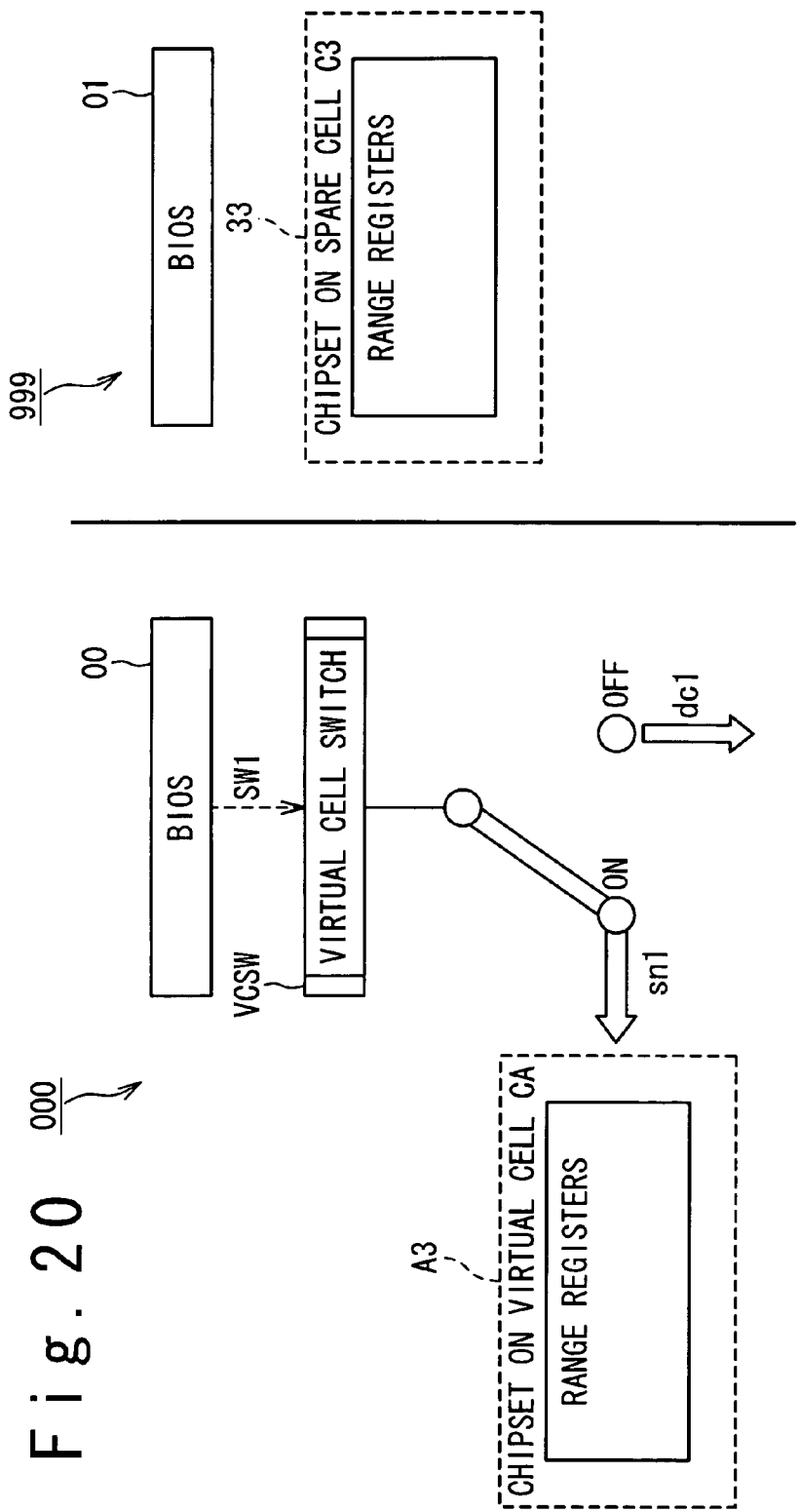
FIG. 20 is a block diagram illustrating architecture of the distributed computer system in a second embodiment.

As shown in FIG. 20, the online system 000 includes a virtual cell switch and a virtual cell CA for each spare cell; it should be noted that both of the virtual cell switch and the virtual cell CA are hardware resources in this embodiment. A memory may be used as the virtual cell CA. In the system shown in FIG. 20, for instance, the online system 000 includes a virtual cell switch vcsw, and a virtual cell CA for the spare cell C3.

The virtual cell switch vcsw is turned on before the spare cell C3 is activated. When a write operation of desired initial values is destined for the spare cell C3, the turn-on of the virtual cell switch vcsw allows the initial values to be transferred to the virtual range registers within the virtual cell CA, the virtual range registers being mapped to the virtual PCI configuration space vccs contained by the virtual cell CA; the initial values to be set into the spare cell C3 are not discarded.

Figure 21:
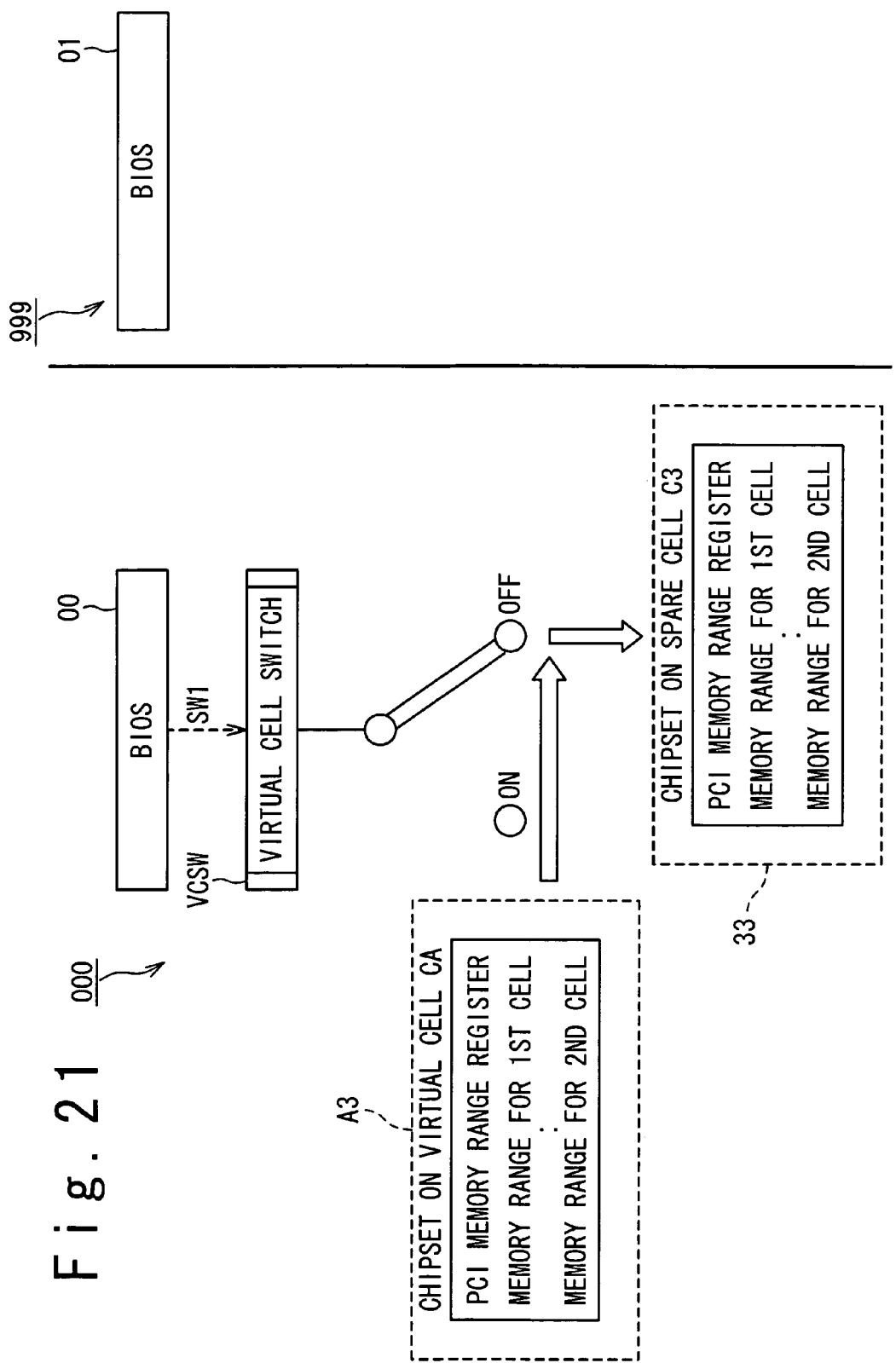
FIG. 21 is another block diagram illustrating the architecture of the distributed computer system in the second embodiment.

When the activation of the spare cell C3 is requested, as shown in FIG. 21, the virtual cell switch vcsw is turned off. This allows the virtual cell CA to automatically transfer the initial values contained in the virtual range registers thereof to the chipset 33 on the spare cell C3, as designated by an arrow cp1 in FIG. 21.

As thus described, the distributed computer system in this embodiment achieves snooping the initial values to be set to the spare cell C3 and initializing the spare cell C3 using the snooped initial values by the virtual cell switch vcsw and the virtual cell CA, both of which are hardware.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

Figure 22:
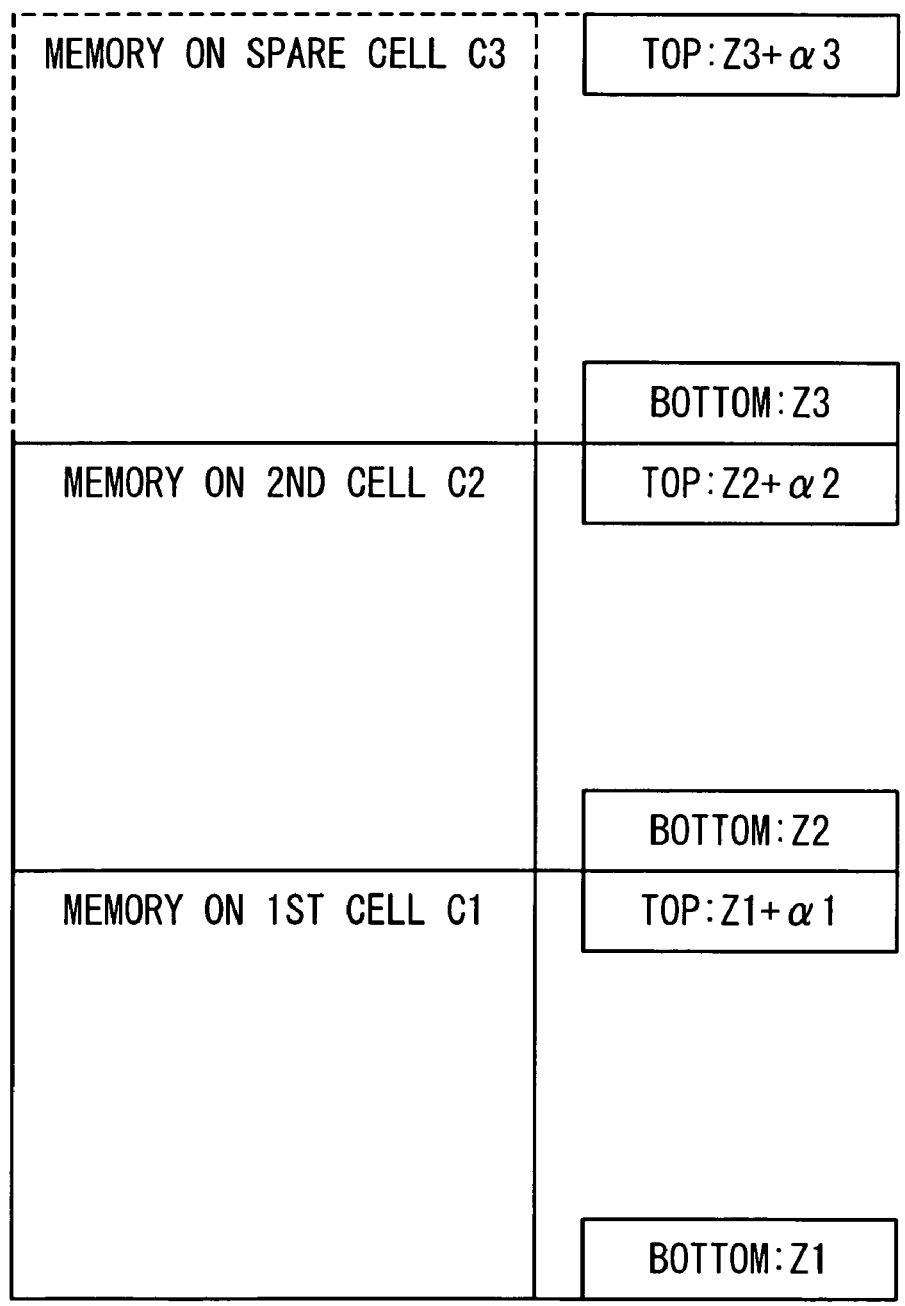
FIG. 22 illustrates memory ranges assigned to the respective memories within a PCI memory space.

Especially, it should be noted that the chipsets on all the incorporable cells are not necessary configured with the same initial values. One example is installation of an expanded memory 32 on the spare cell C3 (See FIG. 22). The expanded memory 32 is previously determined as being assigned to a predetermined memory region before activation of the spare cell C3. For the case of FIG. 22, the predetermined memory region has bottom and top addresses of "Z3" and "Z3+α3". In this case, the BIOS 00 contains the location of the predetermined memory region, including the bottom and top addresses, in the virtual range register associated with the predetermined memory region, the associated range register being mapped onto the memory-mapped virtual PCI configuration space mvccs. Instead, the location of the predetermined memory region may be contained in the virtual range register within the virtual PCI configuration space vccs prepared on the hardware resource shown in FIGS. 20 and 21. When activating the spare cell C3, the BIOS 01, which is operated on the spare cell C3, refers to the copy of the memory-mapped virtual PCI configuration space mvccs to obtain the location of the predetermined memory region, and puts the obtained location into a range register within the chipset 33 on the spare cell C3. This achieves installation of the expanded memory 32 onto the memory range between the bottom address of "Z3" and the top address of "Z3+α3". Putting the location into the range register within the chipset 33 may be achieved by hardware when the hardware resources are used to snoop and copy of the initial values as shown in FIGS. 20 and 21.

What is claimed is:

1. A distributed computer system comprising:
    a plurality of cells each including a CPU, a memory, and a set of range registers used for resource routing, said plurality of cells including at least one spare cell that is not activated, and remainder of said cells being activated to provide an online system such that the at least one spare cell is not part of said online system;
    a first module programmed to store a memory region of said online system with initial values to be set into said spare cell, in response to booting said online system;
    a service processor storing a first memory of said spare cell with a copy of said initial values stored in said memory region, in response to a request for activating said spare cell; and
    a second module programmed to put said initial values obtained from said copy into a first set of range registers of said spare cell,
    wherein said second module is programmed to generate a grant for activating said spare cell after putting said initial values, and
    wherein said service processor activates said spare cell in response to said grant received from said second module without rebooting said online system,
    wherein said first module is further programmed:
    to provide a virtual PCI configuration space within said memory region onto which said first set of range registers of said spare cell are virtually mapped,
    to generate a destination address from a PCI configuration address destined for said first set of range registers of said spare cell, and
    to put said initial values into a destination identified by said destination address of said virtual PCI configuration space.

2. The distributed computer system according to claim 1, wherein said first module is further programmed:
    to generate an association table that respectively indicates an association of said plurality of the cells with a plurality of bus numbers,
    to obtain a first bus number associated with said spare cell among said plurality of the bus numbers, from said association table, and
    wherein said PCI configuration address includes said first bus number obtained from said association table.

3. A BIOS for a distributed computer system, said BIOS comprising:
    a first code module; and
    a second code module,
    wherein said distributed computer system includes a plurality of cells each comprising a CPU, a memory, and a chipset containing a set of range registers used for resource routing, said plurality of cells including at least one spare cell that is not activated, remainder of said cells being activated to provide an online system such that the at least one spare cell is not part of said online system,
    wherein said first code module is operable to boot said online system; and the second code module is operable to provide initial values to be set into a first set of range registers of a first chipset of said spare cell onto a memory region of said online system, in response to booting said online system, wherein the BIOS further comprises:

a code module for providing a virtual PCI configuration space/within said memory region of said online system onto which said first set of range registers are virtually mapped, generating a destination address from a PCI configuration address destined for said first set of range registers, and putting said initial values into a destination identified by said destination address within said virtual PCI configuration space, wherein said distributed computer system further includes:

a service processor storing a first memory of said spare cell with a copy of said initial values stored in said memory region, in response to a request for activating said spare cell; and a third module programmed to put said initial values obtained from said copy into a first set of range registers of said spare cell, wherein said third module is programmed to generate a grant for activating said spare cell after putting said initial values, and wherein said service processor activates said spare cell in response to said grant received from said third module without rebooting said online system.

4. The BIOS according to claim 3, further comprising:

a code module for generating an association table that respectively indicates an association of said plurality of the cells with a plurality of bus numbers; and a code module for obtaining a first bus number associated with said spare cell among said plurality of the bus numbers, from said association table, wherein said PCI configuration address includes said first bus number obtained from said association table.

5. A service processor firmware for a distributed computer system, said service processor firmware comprising:

a first code module; and
a second code module, wherein said distributed computer system includes a plurality of cells each comprising a CPU, a memory, and a chipset containing a set of range registers used for resource routing, said plurality of cells including at least one spare cell that is not activated, remainder of said cells being activated to provide an online system such that the at least one spare cell is not part of said online system, and a code module programmed to store a memory region of said online system with initial values to be set into said spare cell, in response to booting said online system, wherein the first code module is operable to provide a copy of initial values, to be set into a first set of range registers in a first chipset of said spare cell, onto a first memory of said spare cell, in response to a request for activating said spare cell, and the second code module is operable to activate said spare cell without rebooting said online system, in response to a signal received from a BIOS which puts said initial values obtained from said copy of said initial values in the first memory, into said first set of range registers of said first chipset of said spare cell, wherein the BIOS is programmed to generate the signal for activating said spare cell after putting said initial values, and wherein the code module is further programmed to provide a virtual PCI configuration space within said memory region onto which said first set of range registers of said spare cell are virtually mapped, generate a destination address from a PCI configuration address destined for said first set of range registers of said spare cell, and put said initial values into a destination identified by said destination address of said virtual PCI configuration space.

6. A BIOS for a distributed computer system, said BIOS comprising:

a first code module;
and a second code module, wherein said distributed computer system includes a plurality of cells each comprising a CPU, a memory, and a chipset containing a set of range registers used for resource routing, said plurality of cells including at least one spare cell that is not activated, remainder of said cells being activated to provide an online system such that the at least one spare cell is not part of said online system, and a code module programmed to store a memory region of said online system with initial values to be set into said spare cell, in response to booting said online system, wherein the first code module is operable to put initial values prepared on a first memory of said spare cell into a first set of range registers of a first chipset of said spare cell, in response to a request for activating said spare cell, and to generate a signal for activating said spare cell after putting said initial values into said first set of range registers, and to transmit said generated signal to the second code module, wherein the second code module is operable to activate said spare cell without rebooting said online system, upon receipt of the generated signal transmitted by said first code module, wherein the code module is further programmed to provide a virtual PCI configuration space within said memory region onto which said first set of range registers of said spare cell are virtually mapped, generate a destination address from a PCI configuration address destined for said first set of range registers of said spare cell, and put said initial values into a destination identified by said destination address of said virtual PCI configuration space.

7. A method for operating a distributed computer system including a plurality of cells each comprising a CPU, a memory, and a chipset containing a set of range registers used for resource routing, said method comprising:

assigning at least one cell among the plurality of the cells as a spare cell;

activating a remainder of said cells, excluding the assigned at least one spare cell, among the plurality of the cells to provide an online system such that the spare cell is not part of the online system;

providing initial values, to be set into a first set of range registers of a first chipset of said spare cell, onto a first memory region of said online system, in response to booting said online system;

providing a copy of said initial values onto a first memory of said spare cell, in response to a request for activating said spare cell; and putting said initial values obtained from said copy into said first set of range registers of said first chipset of said spare cell without rebooting said online system, to activate said spare cell, generating a grant for activating said spare cell after putting said initial values into said first set of range registers; and activating said spare cell in response to said grant received from said second module without rebooting said online system, wherein said providing the initial values includes:

putting said initial values into said first set of range registers of said first chipset of said spare cell through accessing a PCI configuration space to which said first set of range registers are mapped, using a PCI configuration address destined for said first set of range registers of said spare cell; and snooping said initial values to store said initial values onto said first memory region of said online system before said initial values are discarded by the online system.

8. The method according to claim 7, further comprising:

providing a memory-mapped virtual PCI configuration space within said first memory region onto which said first set of range registers of said first chipset of said spare cell are virtually mapped;

generating a destination address from said PCI configuration address, the destination address identifying an address of said first set of range registers; and putting said initial values into the address identified by said destination address within said virtual PCI configuration space.

9. The method according to claim 7, further comprising:

generating an association table that respectively indicates an association of said plurality of the cells with a plurality of bus numbers; and obtaining a first bus number associated with said spare cell among said plurality of the bus numbers, from said association table, wherein said PCI configuration address includes said first bus number obtained from said association table.

10. The method according to claim 8, further comprising:

compressing said memory-mapped virtual PCI configuration space;

storing said compressed memory-mapped virtual PCI configuration space onto a second memory region of said online system, wherein the second memory region is different from the first memory region; and releasing said memory-mapped virtual PCI configuration space from said first memory region after the storing the compressed memory-mapped virtual PCI configuration space onto the second memory region.

11. The method according to claim 7, wherein said providing said copy of said initial values and said snooping said initial values are carried out by a hardware device.

12. The method according to claim 7, further comprising:

preparing a location of a memory range assigned to an expanded memory on said spare cell within a PCI memory space onto a memory-mapped virtual PCI configuration space;

putting said location obtained from said memory-mapped virtual PCI configuration space into a range register among the first set of range registers of said first chipset of said spare cell.

13. The method according to claim 12, wherein said putting said location is carried out by a hardware device.

14. A distributed computer system comprising:

a plurality of cells each including a CPU, a memory, and range registers used for resource routing, said plurality of cells including at least one spare cell that is not activated, and remainder of said cells being activated to provide an online system such that the at least one spare cell is not part of said online system;

means for storing a memory region of said online system with initial values to be set into said spare cell, in response to booting said online system;

means for storing a first memory of said spare cell with a copy of said initial values stored in said memory region, in response to a request for activating said spare cell; and means for putting said initial values obtained from said copy into a first set of range registers of said spare cell;

wherein said means for putting said initial values generates a grant for activating said spare cell after putting said initial values, and wherein said means for storing the first memory of said spare cell activates said spare cell in response to said grant received from said means for putting said initial values without rebooting said online system wherein said means for storing the memory region is configured to provide a virtual PCI configuration space within said memory region onto which said first set of range registers of said spare cell are virtually mapped, to generate a destination address from a PCI configuration address destined for said first set of range registers of said spare cell, and to put said initial values into a destination identified by said destination address of said virtual PCI configuration space.

15. The distributed computer system according to claim 1, wherein the first memory of said spare cell is different from the first set of range registers of said spare cell.

16. The distributed computer system according to claim 15, wherein the first memory of said spare cell is different from the memory region of said online system.

* * * * *